US008244826B2

(12) United States Patent
Benner et al.

(10) Patent No.: US 8,244,826 B2
(45) Date of Patent: Aug. 14, 2012

(54) PROVIDING A MEMORY REGION OR MEMORY WINDOW ACCESS NOTIFICATION ON A SYSTEM AREA NETWORK

(75) Inventors: Alan F. Benner, Poughkeepsie, NY (US); Michael A. Ko, San Jose, CA (US); Gregory F. Pfister, Austin, TX (US); Renato J. Recio, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 11/877,337

(22) Filed: Oct. 23, 2007

(65) Prior Publication Data

US 2009/0106771 A1    Apr. 23, 2009

(51) Int. Cl.
*G06F 15/167* (2006.01)
(52) U.S. Cl. .................... 709/212; 710/305; 710/315
(58) Field of Classification Search ........... 709/212–216
See application file for complete search history.

(56) References Cited

U.S. PATENT DOCUMENTS

| | | | |
|---|---|---|---|
| 6,601,148 B2 | 7/2003 | Beukema et al. | |
| 6,691,217 B2 | 2/2004 | Beukema et al. | |
| 6,704,831 B1 | 3/2004 | Avery | |
| 6,721,806 B2 | 4/2004 | Boyd et al. | |
| 6,725,296 B2 | 4/2004 | Craddock et al. | |
| 6,804,673 B2 | 10/2004 | Sugahara | |
| 6,854,032 B2 | 2/2005 | Dearth et al. | |
| 2002/0124117 A1 | 9/2002 | Beukema et al. | |
| 2002/0165897 A1* | 11/2002 | Kagan et al. | 709/102 |
| 2003/0009432 A1 | 1/2003 | Sugahara et al. | |
| 2003/0091055 A1 | 5/2003 | Craddock et al. | |
| 2004/0049600 A1 | 3/2004 | Boyd et al. | |
| 2004/0193832 A1 | 9/2004 | Garcia et al. | |
| 2004/0205253 A1* | 10/2004 | Arndt et al. | 710/1 |
| 2004/0226030 A1* | 11/2004 | Marvin et al. | 719/328 |
| 2005/0135173 A1 | 6/2005 | Fan | |

OTHER PUBLICATIONS

Braam, Peter J., "The Lustre Storage Architecture", Cluster File Systems, Inc., Oct. 18, 2002, http://euler.aero.iitb.ac.in/download/linux/cluster/lustre.pdf, 234 pages.

(Continued)

*Primary Examiner* — Patrice Winder
*Assistant Examiner* — Tauqir Hussain
(74) *Attorney, Agent, or Firm* — Stephen J. Walder, Jr.; Matthew B. Talpis

(57) ABSTRACT

Mechanisms for providing a memory region/memory window (MR/MW) access notification on a system area network are provided. Whenever a previously allocated MR/MW is accessed, such as via a remote direct memory access (RDMA) read/write operation, a notification of the access is generated and written to a queue data structure associated with the MR/MW. In one illustrative embodiment, this queue data structure may be a MR/MW event queue (EQ) data structure that is created and used for all consumer processes and all MR/MWs. In other illustrative embodiments, the EQ is associated with a protection domain. In yet another illustrative embodiment, an event record may be posted to an asynchronous event handler in response to the accessing of the MR/MW. In another illustrative embodiment, a previously posted queue element may be used to generate a completion queue element in response to the accessing of the MR/MW.

18 Claims, 14 Drawing Sheets

OTHER PUBLICATIONS

Velusamy et al., "Programming the Infiniband Network Architecture for High Performance Message Passing Systems", Verarisoft, Jul. 11, 2003, http://www.verarisoft.com/publications/prog_ib_2003-07-11.pdf, 8 pages.

Gittlen, Sandra, "Soupin' up the bus: InfiniBand, EtherFabric, iWarp: Which high-speed interconnect will you choose to pump up your net?", Network World, Sep. 26, 2005, http://www.networkworld.com/cgi-bin/mailto/x.cgi, 4 pages.

Portal Overview Website, Sandia National Laboratories, http://www.cs.sandia.gov/Portals/portals-info/overview/overview- . . . html, Accessed Sep. 25, 2006, 6 pages.

* cited by examiner

PROVIDING A MEMORY REGION OR MEMORY WINDOW ACCESS NOTIFICATION ON A SYSTEM AREA NETWORK

BACKGROUND

1. Technical Field

The present application relates generally to an improved data processing system and method. More specifically, the present application is directed to a system and method for providing a memory region or memory window access notification on a system area network.

2. Description of Related Art

In a System Area Network (SAN), such as an InfiniBand™ (IB) network or iWarp network, hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These send/receive messages are posted as work requests (WR) to the work queues. The processes that post WRs are referred to as "consumer processes" or simply "consumers."

The send/receive work queues (WQ) are assigned to a consumer process as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The HCA is used by general purpose computing nodes to access the SAN fabric. Consumers use SAN "verbs" to access host channel adapter functions. The software that interprets verbs and directly accesses the channel adapter is known as the channel interface (CI).

Target channel adapters (TCA) are used by nodes that are the subject of messages sent from host channel adapters. The TCAs serve a similar function as that of the HCAs in providing the target node an access point to the SAN fabric.

The SAN described above uses the registration of memory regions (MRs) or memory windows (MWs) to make memory accessible to HCA hardware. Using the verbs defined within the SAN specification, these MRs or MWs must be pinned, i.e. they must remain constant and not be paged out to disk, while the HCA is allowed to access them. When the MR or MW is pinned it may not be used by any other application, even if the MR or MW is not being used by the application that owns it. The MR or MW may be thought of as a portion of memory that the consumer will want the channel adapter (HCA or TCA) to use in a future transfer.

The SAN verb interface used with InfiniBand™ and iWarp networks provides remote direct memory access (RDMA) communications between host nodes. RDMA allows data to move directly from the memory of one host node into that of another host node without involving either one's operating system. This permits high-throughput, low-latency networking, which is especially useful in massively parallel computer clusters.

Today, a consumer process (e.g., an application layer middleware) utilizing RDMA verbs of the SAN verb interface, creates a memory region (MR) or memory window (MW) on the host node and utilizes this MR or MW to transfer data via RDMA communications. In a RDMA fabric such as this, data is transmitted in packets that are taken together to form a message.

A typical RDMA transaction oriented protocol exchange between a first host node and a second host node in a SAN can be exemplified in the following manner with reference to FIG. 14. A first upper layer protocol (ULP) consumer 1410, i.e. a consumer utilizing an abstract protocol when performing encapsulation of data communications, of a first host node 1405 uses a Send work request (WR) 1415, which is posted to a send/receive queue pair (QP) 1418 associated with the first ULP consumer 1410, to request a RDMA enabled host channel adapter 1420 to perform a ULP Request RDMA data transfer operation from the second host node 1430. The ULP Request in the Send WR 1415 specifies a pre-allocated MR or MW 1440 to be used with the RDMA data transfer. The second host node's ULP consumer 1450 digests the first ULP Request, i.e. generates a hash fingerprint of the first ULP Request, and performs a RDMA Write of the requested data to the pre-allocated MR or MW 1440, via posting of an appropriate RDMA Write WR in its own send/receive queue pair (QP) 1458 which gets transformed into a RDMA data transfer to the first host node 1405.

After the second host node's ULP consumer 1450 sends the requested data to the first ULP consumer 1410 via a RDMA Write data transfer, the second host node's ULP consumer 1450 sends a ULP Response message to the first ULP consumer 1410 in the form of a Work Completion (WC) element 1460 that is posted to a completion queue (CQ) 1470 associated with the first ULP consumer 1410. The first ULP consumer 1410 then retrieves the WC element 1460 that contains the ULP Response message from the corresponding CQ 1470. After receiving the ULP Response message, the first ULP consumer 1410 performs a check of the data transferred by the RDMA Write to make sure that it has the correct signature.

Thus, in order for the first ULP consumer 1410 to know that the requested data transfer has been performed, the target of the Send WR posted by the first host node 1405, i.e. the second ULP consumer 1450, must respond with a WC element 1460 that informs the first ULP consumer 1410 that the requested data is ready for the first ULP consumer 1410 to process. The first ULP consumer 1410 must then retrieve the WC element 1460 from its CQ 1470, process it, and then verify that the data that was transferred is correct.

The above description is directed to known SAN systems such as InfiniBand™ and iWarp. More information about InfiniBand™ may be obtained from the specification documents available from the InfiniBand™ Trade Association at www.infinibandta.org/specs/. More information about iWarp may be found at IETF Remote Direct Data Placement Working Group home page at http://www1.ietf.org/html.charters/rddp-charter.html.

The Portals application program interface (API) is an API that utilizes a one-sided data movement model rather than a two-sided data movement model, such as is used in the SAN environment described above, see http://www.cs.sandia.gov/Portals/portals-info/portals-index.html, for example. The Portals API uses an address triplet plus a set of match bits to perform data transfers between an initiator and a target. This address triplet comprises a process id, a portal id, and an offset. The process id identifies a target process, the portal id specifies a memory buffer or region of memory, i.e. a portal, to be used for the data transfer operation, and the offset specifies an offset within the memory buffer or region of memory.

Specifically, the process id is used to route a message or data transfer to an appropriate node (not depicted). As shown in FIG. 15, the portal id is used as an index into a portal table 1510 of the node. Each element of the portal table 1510 identifies a match list 1520. Each element of the match list specifies two bit patterns: a set of "don't care" bits, and a set of "must match" bits. In addition to the two sets of match bits, each match list element has at most one memory descriptor 1530. Each memory descriptor identifies a memory region, or portal, 1540 and an optional event queue 1550. The memory region or portal 1540 is the portion of memory to be used in the data transfer operation and the event queue 1550 is used to record information about the data transfer operation. The offset is used as an offset into the memory region or portal 1540.

When translating a Portal address, the match criteria of a first element in the match list 1520 corresponding to the portal table 1510 entry associated with the portal id is checked. If the match criteria specified in the match list entry are met, and the memory descriptor 1530 accepts the operation (e.g., a put, get, or swap operation), the operation is performed using the memory region 1540 specified in the memory descriptor. If the memory descriptor specifies that it is to be unlinked when a threshold has been exceeded, the match list entry is removed from the match list 1520 and the resources associated with the memory descriptor 1530 and match list entry are reclaimed. If there is an event queue 1550 specified in the memory descriptor 1530 and the memory descriptor 1530 accepts the event, the operation is logged in the event queue 1550.

If the match criteria specified in the match list entry are not met, or there is no memory descriptor 1530 associated with the match list entry, or the memory descriptor 1530 associated with the match list entry rejects the operation, the address translation continues with the next match list entry in the match list 1520. If the end of the match list 1520 has been reached, the address translation is aborted and the incoming request is discarded.

Thus, with the Portals API, an event may be automatically generated upon the accessing of a previously registered memory region, or portal. Such functionality is not currently present in the known SAN architectures. Therefore, it would be beneficial to have an improved SAN architecture that provides the infrastructure for the generation and tracking of events upon access of a previously registered memory region.

SUMMARY

The illustrative embodiments provide a system and method for providing a memory region or memory window access notification on a system area network. With the mechanisms of the illustrative embodiments, whenever a previously allocated memory region or memory window is accessed, such as via a remote direct memory access (RDMA) read/write operation, a notification of the access is generated and written to a queue data structure associated with the memory region/memory window.

In one illustrative embodiment, this queue data structure may be a memory region/memory window (MR/MW) event queue data structure that is created and used for all consumer processes and all memory regions/memory windows. For example, the MR/MW event queue data structure may be created in response to the initialization of the data processing system, initialization of the operating system, in response to the initialization of an upper layer protocol (ULP) consumer process on the data processing system, or the like.

With this illustrative embodiment, consumer processes, e.g., a client ULP consumer process, in response to a RDMA work request (WR), such as from a server ULP process, perform a RDMA Read/Write operation of the data specified in the RDMA WR to/from a pre-allocated MR/MW which is identified in the RDMA WR. Rather than having the client consumer process send a Response message to the server ULP's work completion queue such that the server ULP must retrieve the work completion queue element and process it, event generation mechanisms of the illustrative embodiments provide for the automatic generation of a MR/MW event queue element in response to the accessing of a MR/MW. With this illustrative embodiment, all accesses to all MR/MWs of the system generate event entries that are posted to the same MR/MW event queue.

In response to the posting of the event queue element to the MR/MW event queue, an interrupt is generated which causes a corresponding interrupt handler process on the server to check the event queue for a new event queue element. The event queue element includes an identifier, e.g., a remote access key (R_Key) in an InfiniBand™ architecture or a STag in an iWarp architecture, which is used to identify which remote devices, e.g., client devices, are authorized to access particular memory regions or memory windows. The R_Key, for example, is an opaque object, created by a Verb, referring to a memory region or memory window, which is used with a virtual address to describe authorization for the remote device to access local memory. The R_Key may also be used by a host channel adapter hardware to identify the appropriate page tables for use in translating virtual addresses to physical addresses.

The interrupt handler process may extract the identifier, e.g., the R_Key, from the event queue element and map the event to the originating server consumer process. The interrupt handler process may then inform the originating server consumer process of the event. The server consumer process may continue processing, in a manner generally known in the art, having now received confirmation of the performance of the RDMA operation.

In other illustrative embodiments, memory region/memory window events may make use of an asynchronous event queue data structure provided in the system area network (SAN) architecture, e.g., in the InfiniBand™ architecture. For example, in the InfiniBand™ architecture specification, an asynchronous event handler is described. This asynchronous event handler may receive event queue entries in response to a MR/MW access operation being performed, e.g., a RDMA operation. The asynchronous event handler may extract the identifier, e.g., R_Key, STag, or the like, from the event queue element and may perform similar functions as discussed above with regard to the interrupt handler in identifying a corresponding originating consumer process and notifying the originating consumer process of the event.

In an alternative illustrative embodiment, protection domains may be used to correlate memory region/memory window access with event queue data structures and consumer processes. With this alternative illustrative embodiment, there may be multiple event queue data structures associated with memory regions/memory windows, e.g., one per protection domain. A protection domain is a mechanism in SAN architectures, such as InfiniBand™, for associating queue pairs, address handles, memory windows, and memory regions. Protection domains allow a consumer process to control which set of its memory regions and memory windows can be accessed by which set of its queue pairs.

In this illustrative embodiment, when a MR/MW of a protection domain is accessed, the event generation mechanisms of the illustrative embodiments identify the protection domain with which the MR/MW access is performed, which may be specified in the RDMA work request and RDMA operation, and post an event element in a corresponding MR/MW event queue data structure associated with the protection domain. An interrupt may then be generated. The interrupt may be received by the interrupt handler process which then informs the associated server consumer process of that protection domain. Thus, with this illustrative embodiment, rather than having to determine which server consumer process is to be informed of the event queue element based on an identifier in the event queue element, e.g., an R_Key, this alternative illustrative embodiment permits automatic identification of the server consumer process by way of its association via the protection domain.

In yet another illustrative embodiment, memory region/memory window events may consume a receive queue work queue element and use the receive queue's completion queue. In this illustrative embodiment, an originating consumer process posts a work queue element (WQE) into a corresponding receive queue (RQ) of a queue pair (QP). When the MR/MW access occurs, the mechanisms of the illustrative embodiment automatically convert the RQ's WQE into a completion queue element (CQE) that identifies the MR/MW that was accessed and identifies the completion of the access to the MR/MW. Thereafter, the originating consumer process is notified of the CQE using the mechanisms present in the SAN architecture for processing CQEs.

In one illustrative embodiment, a method for informing a process of an access to a pre-allocated memory region/memory window (MR/MW) of the data processing system is provided. The method may comprise receiving, in a channel adapter, a Remote Direct Memory Access (RDMA) message for accessing a MR/MW of the data processing system identified by an identifier of the MR/MW included in the RDMA message and processing the RDMA message in the channel adapter to write data associated with the RDMA message to the MR/MW identified by the identifier. The method may further comprise automatically notifying a process associated with the MR/MW of the write of data to the MR/MW in response to the writing of the data to the MR/MW and processing, by the process, the data in the MR/MW in response to the notification.

Automatically notifying the process associated with the MR/MW of the write of data to the MR/MW may comprise posting an event queue element (EQE) to an event queue (EQ). Moreover, automatically notifying the process associated with the MR/MW of the write of data to the MR/MW may further comprise generating an interrupt to an interrupt handler, processing the interrupt to identify the process associated with the MR/MW based on the identifier, and sending a notification to the process that an EQE is ready for processing in the EQ in response to processing the interrupt. The EQ may receive EQEs associated with write operations to all MR/MWs of the data processing system.

The EQ may be associated with a protection domain of the data processing system such that there are a plurality of EQs, one for each protection domain of the data processing system. In such a case, automatically notifying the process associated with the MR/MW of the write of data to the MR/MW may further comprise identifying a protection domain associated with the MR/MW based on the identifier, identifying an EQ associated with the identified protection domain, and posting the EQE to the EQ associated with the identified protection domain.

Automatically notifying the process associated with the MR/MW of the write of data to the MR/MW may comprise posting an event record to an asynchronous event handler of the data processing system. Automatically notifying the process associated with the MR/MW of the write of data to the MR/MW may further comprise identifying, by the asynchronous event handler, the process associated with the MR/MW based on the identifier and sending a notification to the process that the event record is available for processing in the asynchronous event handler.

The method may further comprise posting a work queue element (WQE) to a receive queue of the channel adapter and generating a completion queue element (CQE) in a completion queue of the channel adapter, based on information in the WQE, in response to receiving the RDMA message for accessing the MR/MW. Automatically notifying the process associated with the MR/MW of the write of data to the MR/MW may comprise processing, by the process, the CQE. The RDMA message for accessing the MR/MW may be a RDMA message generated by an external device in response to a RDMA read work request transmitted to the external device by the data processing system.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide mechanisms for a system and method for providing a memory region or memory window access notification on a system area network. For example, the mechanisms of the illustrative embodiments provide for automatically informing an originating consumer process of completion of a memory region/memory window access, such as via a RDMA operation. The mechanisms of the illustrative embodiments are preferably implemented in a System Area Network (SAN), such as a data processing environment implementing the InfiniBand™ architecture or iWarp architecture. In order to provide a context in which the mechanisms of the illustrative embodiments may be described, an example of an InfiniBand™ architecture will first be described with regard to FIGS. 1-4.

Figure 1:
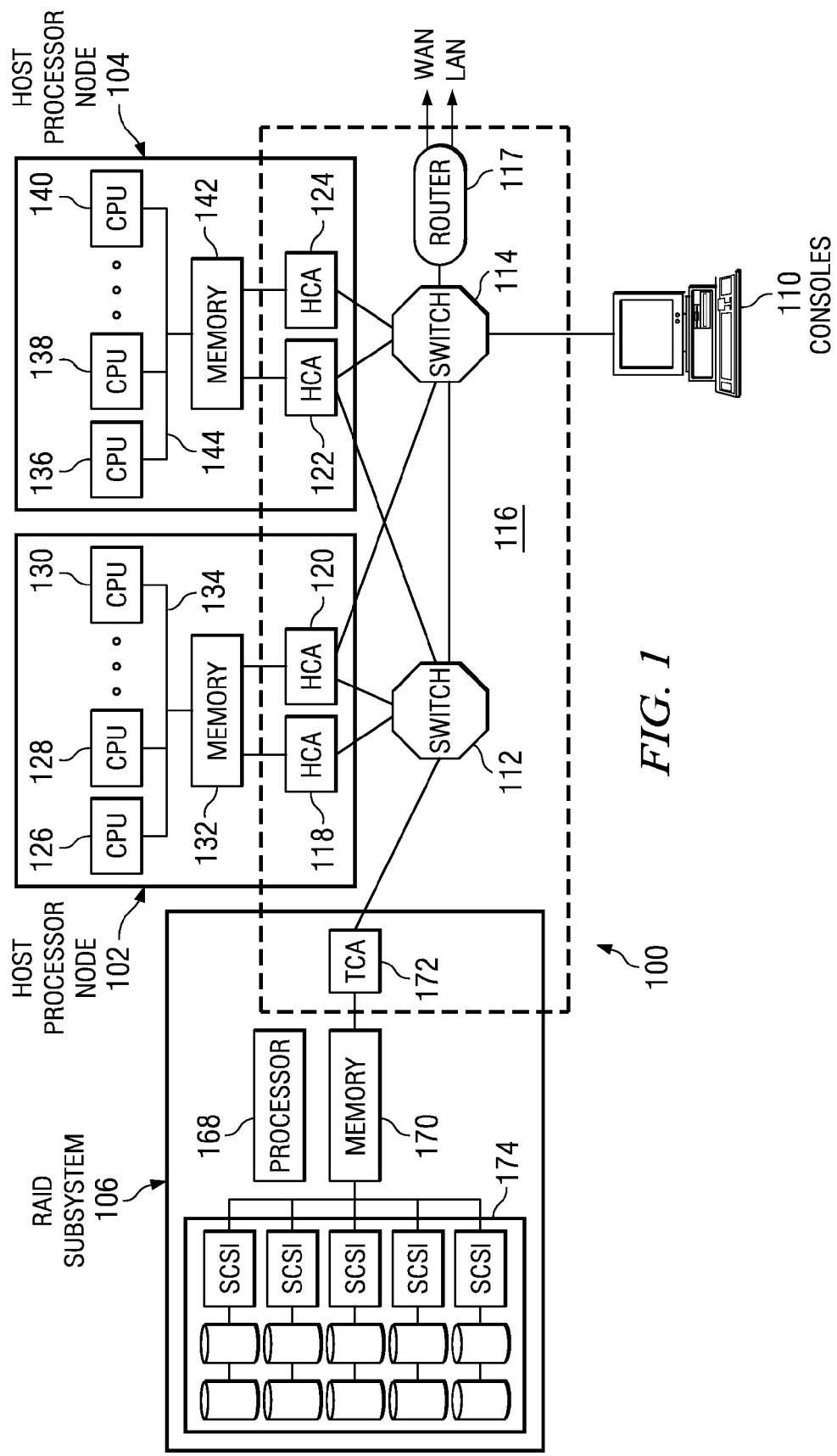
FIG. 1 is an exemplary diagram of a distributed computer system in which exemplary aspects of the illustrative embodiments may be implemented.

With reference now to the figures and in particular with reference to FIG. 1, an exemplary diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, and redundant array of independent disks (RAID) subsystem node 106. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID). Switch 114 may provide communication access to consoles 110 through which the consoles 110 may access the various elements of the SAN 100.

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102 and host processor node 104 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter (HCA) 118 and host channel adapter 120. Host processor node 104 contains host channel adapter 122 and host channel adapter 124. Host processor node 102 also includes central processing units (CPUs) 126-130 and a memory 132 interconnected by bus system 134. Host processor node 104 similarly includes central processing units 136-140 and a memory 142 interconnected by a bus system 144.

Host channel adapters 118, 120, 122, and 124 provide a connection to switches 112 and 114. In one embodiment, a host channel adapter 118, 120, 122 and/or 124 is implemented in hardware. In this implementation, the host channel adapter hardware offloads much of central processing unit and I/O adapter communication overhead. This hardware implementation of the host channel adapter 118 and/or 120 also permits multiple concurrent communications over a switched network without the traditional overhead associated with communicating protocols.

In one embodiment, the host channel adapters and SAN 100 in FIG. 1 provide the I/O and inter-processor communications (IPC) consumers of the distributed computer system with zero processor-copy data transfers without involving the operating system kernel process, and employs hardware to provide reliable, fault tolerant communications. As indicated in FIG. 1, router 117 is coupled to wide area network (WAN) and/or local area network (LAN) connections to other hosts or other routers.

In this example, RAID subsystem node 106 in FIG. 1 includes a processor 168, a memory 170, a target channel adapter (TCA) 172, and multiple redundant and/or striped storage disk unit (SCSI) 174. Target channel adapter 172 can be a fully functional host channel adapter, for example.

SAN 100 handles data communications for I/O and inter-processor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and inter-processor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
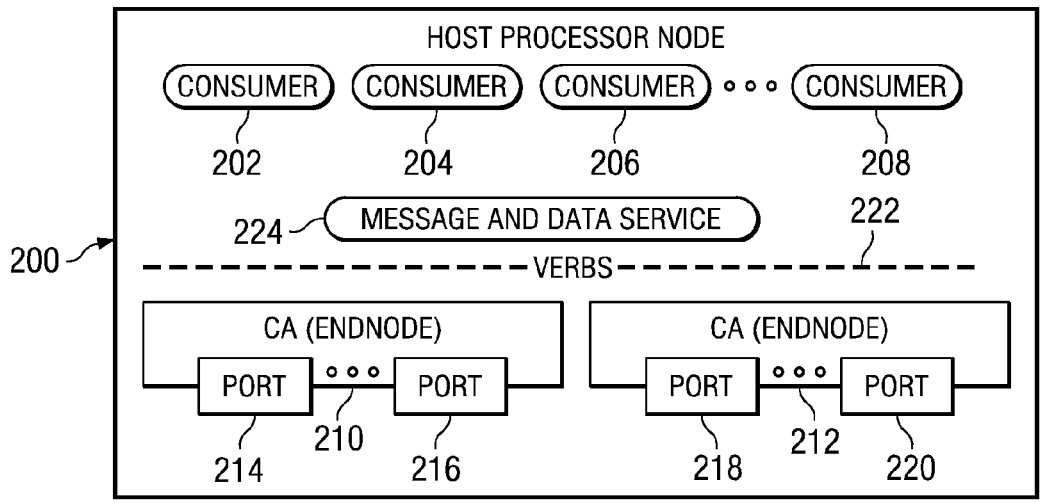
FIG. 2 is an exemplary functional block diagram of a host processor node in accordance with one illustrative embodiment.

Turning next to FIG. 2, an exemplary functional block diagram of a host processor node is depicted in accordance with one illustrative embodiment. Host processor node 200 is an example of a host processor node, such as host processor node 102 in FIG. 1. In this example, host processor node 200 shown in FIG. 2 includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

Figure 3:
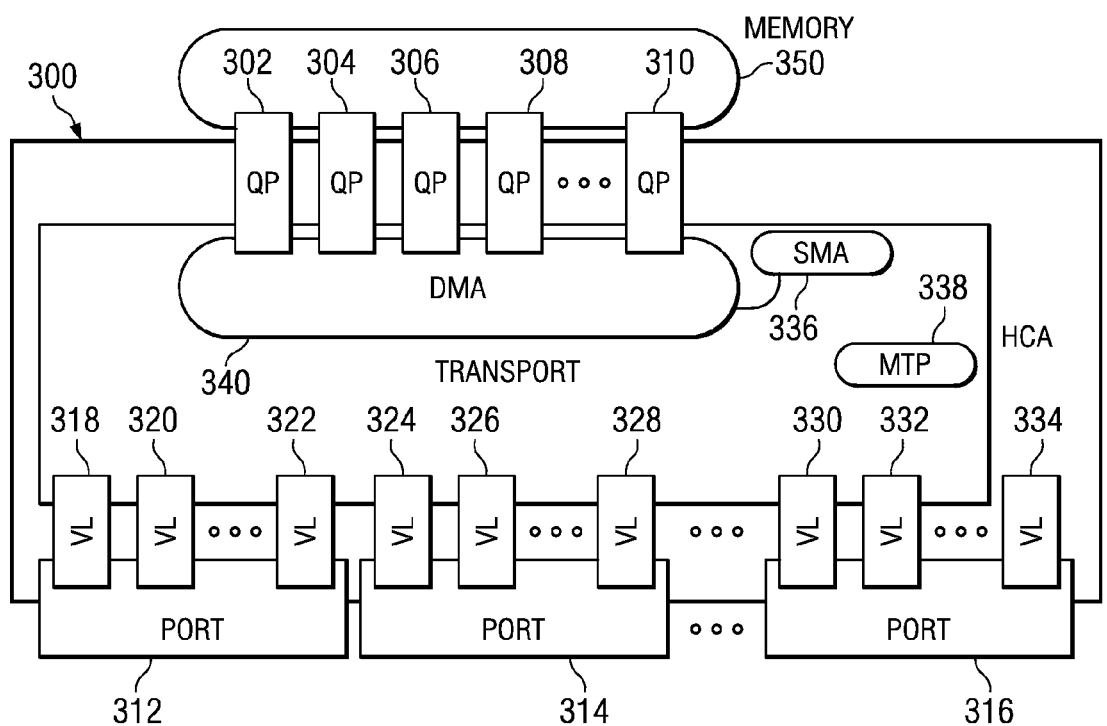
FIG. 3 is an exemplary diagram of a host channel adapter in accordance with an illustrative embodiment.

With reference now to FIG. 3, an exemplary diagram of a host channel adapter is depicted in accordance with an illustrative embodiment. Host channel adapter 300 shown in FIG. 3 includes a set of queue pairs (QPs) 302-310, which are used to transfer messages to the host channel adapter ports 312-316. Buffering of data to host channel adapter ports 312-316 is channeled through virtual lanes (VL) 318-334 where each VL has its own flow control. The subnet manager configures channel adapters with the local addresses for each physical port, i.e., the port's LID.

Subnet manager agent (SMA) 336 is the entity that communicates with the subnet manager for the purpose of configuring the channel adapter. Memory translation and protection (MTP) 338 is a mechanism that translates virtual addresses to physical addresses and validates access rights. Direct memory access (DMA) 340 provides for direct memory access operations using memory 350 with respect to queue pairs 302-310.

A single channel adapter, such as the host channel adapter 300 shown in FIG. 3, can support thousands of queue pairs. By contrast, a target channel adapter in an I/O adapter typically supports a much smaller number of queue pairs. Each queue pair consists of a send work queue and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
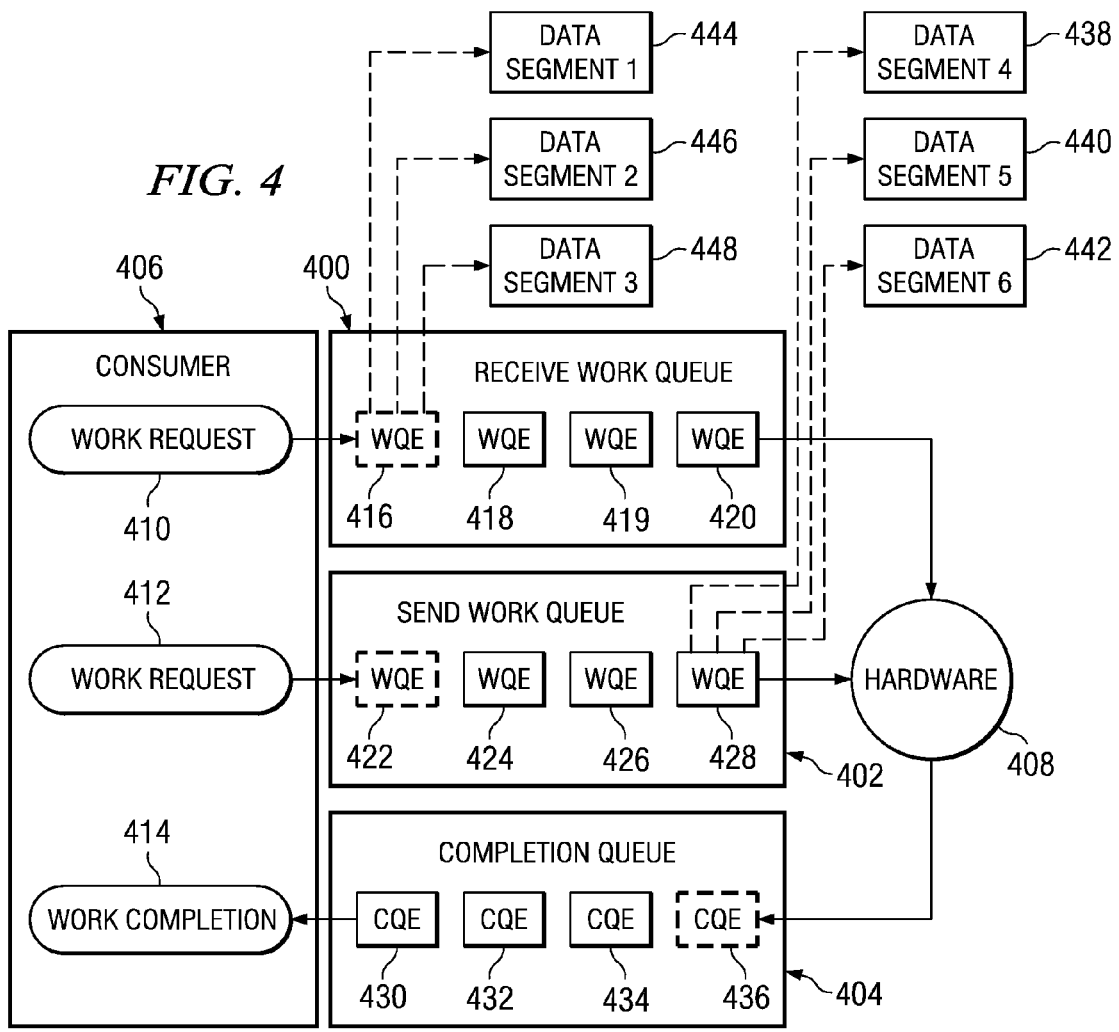
FIG. 4 is an exemplary diagram illustrating processing of work requests in accordance with one illustrative embodiment.

With reference now to FIG. 4, an exemplary diagram illustrating processing of work requests is depicted in accordance with one illustrative embodiment. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. A work queue element may contain one or more data segments 438-448 which may be processed by hardware 408 in the host channel adapter.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element references a gather list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

Figure 5:
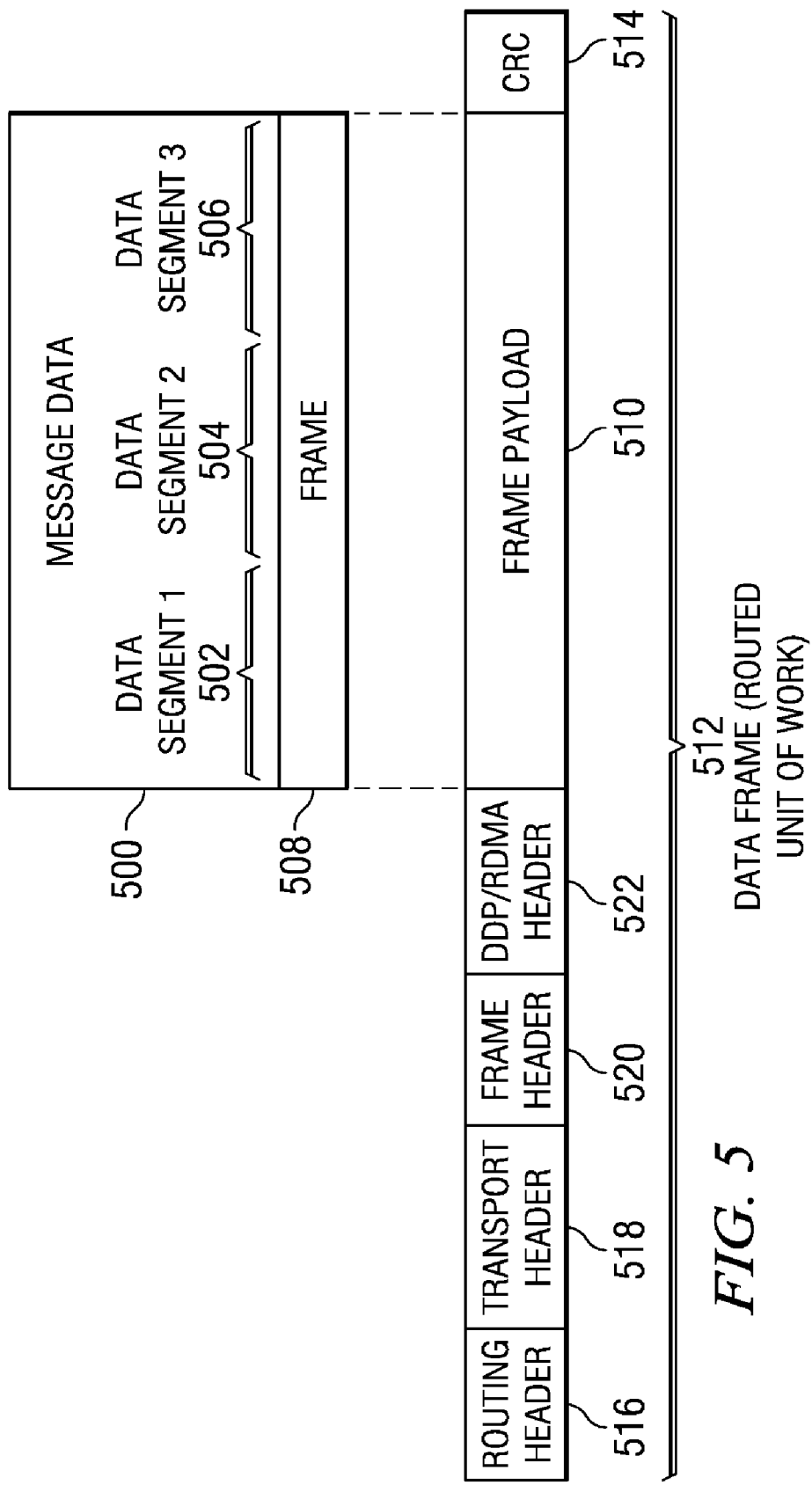
FIG. 5 is an exemplary illustration of a data frame in accordance with one illustrative embodiment.

Turning next to FIG. 5, an exemplary illustration of a data frame is depicted in accordance with one illustrative embodiment. A data frame is a unit of information that is routed through the SAN fabric, such as by using an Internet Protrocol/Transmission Control Protocol. The data frame is an endnode-to-endnode construct, and is thus created and consumed by endnodes. For frames destined to a channel adapter, the data frames are neither generated nor consumed by the switches and routers in the SAN fabric. Instead for data frames that are destined to a channel adapter, switches and routers simply move request frames or acknowledgment frames closer to the ultimate destination, modifying the link header fields in the process. Routers may modify the frame's network header when the frame crosses a subnet boundary. In traversing a subnet, a single frame stays on a single service level.

Message data 500 contains data segment 1 502, data segment 2 504, and data segment 3 506, which are similar to the data segments illustrated in FIG. 5. In this example, these data segments form a frame 508, which is placed into frame payload 510 within data frame 512. Additionally, data frame 512 contains cyclic redundancy check (CRC) 514, which is used for error checking. Additionally, routing header 516 and transport header 518 are present in data frame 512. Routing header 516 is used to identify source and destination ports for data frame 512. Transport header 518 in this example specifies the sequence number and the source and destination port number for data frame 512. The sequence number is initialized when communication is established and increments by 1 for each byte of frame header, DDP/RDMA header, data payload, and CRC. Frame header 520 in this example specifies the destination queue pair number associated with the frame and the length of the Direct Data Placement and/or Remote Direct Memory Access (DDP/RDMA) header plus data payload plus CRC. DDP/RDMA header 522 specifies the message identifier and the placement information for the data payload. The message identifier is constant for all frames that are part of a message. Example message identifiers include, for example, send, write RDMA, and read RDMA.

With the above architecture description as a basis, it will be appreciated that the illustrative embodiments provide a system and method for providing a memory region or memory window access notification on a system area network. With the mechanisms of the illustrative embodiments, whenever a previously allocated memory region or memory window is accessed, such as via a RDMA read/write operation, a notification of the access is generated and written to a queue data structure associated with the memory region/memory window. The writing of the notification to the queue data structure automatically generates an interrupt or other notification within the same data processing system that is handled by an interrupt handler, an asynchronous event handler, an originating consumer process, or the like, of the data processing system. This interrupt or notification informs the originating consumer process that the access to the memory region or memory window has completed such that continued operation of the originating consumer process may continue with regard to the accessed memory region or memory window.

In some illustrative embodiments, a queue data structure may be utilized for performing the notification operation. In one illustrative embodiment, this queue data structure is a memory region/memory window (MR/MW) event queue data structure that is created and used for all consumer processes and all memory regions/memory windows. For example, the MR/MW event queue data structure may be created in response to the initialization of the data processing system, initialization of the operating system, in response to the initialization of an upper layer protocol (ULP) consumer process on the data processing system, or the like.

With this illustrative embodiment, consumer processes, e.g., a client ULP consumer process, in response to a RDMA work request (WR), such as from a server ULP process, perform a RDMA Read/Write operation of the data specified in the RDMA WR to/from a pre-allocated MR/MW which is identified in the RDMA WR. Rather than having the client consumer process send a Response message to the server ULP's completion queue such that the server ULP must retrieve the completion queue element and process it, event generation mechanisms of the illustrative embodiments, such as may be provided in a host channel adapter, provide for the automatic generation of a MR/MW event queue element in response to the accessing of a MR/MW. With this illustrative embodiment, all accesses to all MR/MWs of the system generate event entries that are posted to the same MR/MW event queue.

In response to the posting of the event queue element to the MR/MW event queue, an interrupt is generated which causes a corresponding interrupt handler process on the server to check the event queue for a new event queue element. The event queue element includes an identifier, e.g., an R_Key in an InfiniBand™ architecture or a STag in an iWarp architecture, which is used to identify which remote devices, e.g., client devices, are authorized to access particular memory regions or memory windows. The R_Key, for example, is an opaque object, created by a Verb, referring to a memory region or memory window, which is used with a virtual address to describe authorization for the remote device to access local memory. The R_Key may also be used by host channel adapter hardware to identify the appropriate page tables for use in translating virtual addresses to physical addresses.

The interrupt handler process may extract the identifier, e.g., the R_Key, from the event queue element and map the event to the originating server consumer process. The interrupt handler process may then inform the originating server consumer process, e.g., a ULP consumer process, of the event. The server consumer process may continue processing, in a manner generally known in the art, having now received confirmation of the performance of the RDMA operation.

In an alternative illustrative embodiment, protection domains may be used to correlate memory region/memory window access with event queue data structures and consumer processes. With this alternative illustrative embodiment, there may be multiple event queue data structures associated with memory regions/memory windows, e.g., one per protection domain. A protection domain is a mechanism in SAN architectures, such as InfiniBand™, for associating queue pairs, address handles, memory windows, and memory regions. Protection domains allow a consumer process to control which set of its memory regions and memory windows can be accessed by which set of its queue pairs.

In this illustrative embodiment, when a MR/MW of a protection domain is accessed, the event generation mechanisms of the illustrative embodiments identify the protection domain with which the MR/MW access is performed, which may be specified in the RDMA work request and RDMA operation, and post an event element in a corresponding MR/MW event queue data structure associated with the protection domain. An interrupt may then be generated. The interrupt may be received by the interrupt handler process which then informs the associated server consumer process of that protection domain. Thus, with this illustrative embodiment, rather than having to determine which server consumer process is to be informed of the event queue element based on an identifier in the event queue element, e.g., an R_Key, this alternative illustrative embodiment permits automatic identification of the server consumer process by way of its association via the protection domain.

In other illustrative embodiments, memory region/memory window events may make use of an asynchronous event queue data structure provided in the system area network (SAN) architecture, e.g., in the InfiniBand™ architecture. For example, in the InfiniBand™ architecture specification, an asynchronous event handler is described. This asynchronous event handler, in accordance with the illustrative embodiments, may receive event queue entries in response to a MR/MW access operation being performed, e.g., a RDMA operation. The asynchronous event handler may extract the identifier, e.g., R_Key, STag, or the like, from the event queue element and may perform similar functions as discussed above with regard to the interrupt handler in identifying a corresponding originating consumer process and notifying the originating consumer process of the event.

In yet another illustrative embodiment, memory region/memory window events may consume a receive queue work queue element and use the receive queue's completion queue. In this illustrative embodiment, an originating consumer process posts a work queue element (WQE) into a corresponding receive queue (RQ) of a queue pair (QP). When the MR/MW access occurs, the mechanisms of the illustrative embodiment automatically convert the RQ's WQE into a completion queue element (CQE) that identifies the MR/MW that was accessed. Thereafter, the originating consumer process is notified of the CQE using the mechanisms present in the SAN architecture for processing CQEs. The originating consumer process may then process the CQE to thereby be informed of the RDMA access to the MR/MW.

Figure 6:
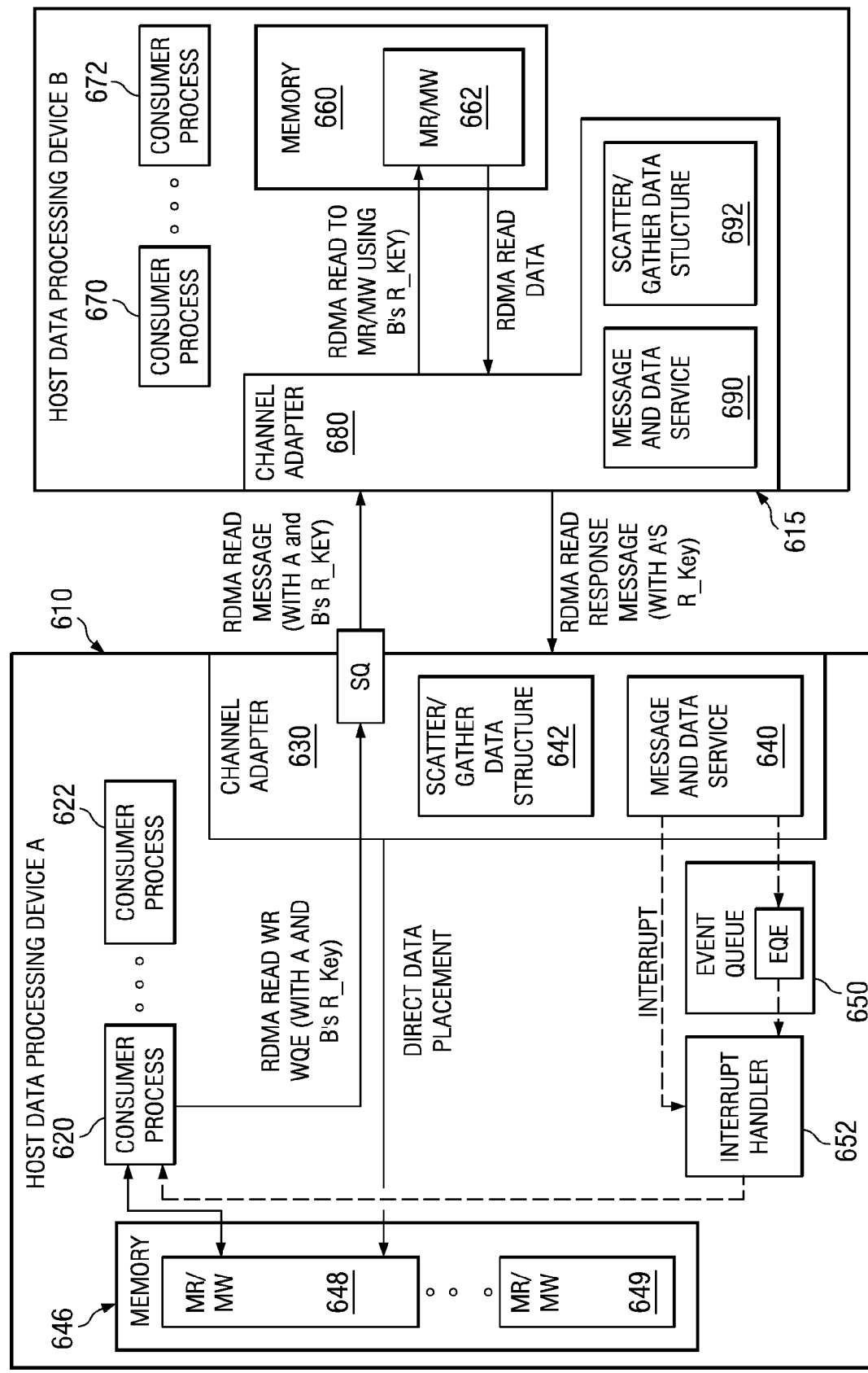
FIG. 6 is an exemplary block diagram illustrating a RDMA write operation in which a single MR/MW event queue data structure is utilized for all consumer processes of a data processing system.

FIG. 6 is an exemplary block diagram illustrating a RDMA read operation in which a single MR/MW event queue data structure is utilized for all consumer processes of a data processing system in accordance with one illustrative embodiment. The operation shown in FIG. 6 is a RDMA read operation for a typical interaction between a first host data processing device A 610, which may be a server data processing device, for example, and a second host data processing device B 615, which may be, for example, another server data processing device, a client data processing device, or the like, in accordance with one illustrative embodiment. The second host data processing device B 615 may provide, for example, a RAID subsystem node 106 in FIG. 1 while the first host data processing device A 610 may be, for example, a host processor node 102 or 104 in FIG. 1, which reads data from the RAID subsystem node 106. While FIG. 6 depicts a RDMA read operation, it should be appreciated that a similar operation is performed for RDMA write operations as well.

As shown in FIG. 6, the first host data processing device A 610 may comprise a plurality of consumer processes 620-622 and a channel adapter 630 that provides mechanisms for supporting one or more queue pairs comprising a receive queue (RQ) and a send queue (SQ) (only the send queue is depicted since it is the only portion of the queue pair used in the transaction between the host data processing devices 610 and 615 as described hereafter). The first host data processing device A 610 further comprises a message and data service 640 which, among other messaging and data operations, operates to monitor the mechanisms of the channel adapter 630 in order to automatically generate event queue elements (EQEs) in an event queue (EQ) data structure 650 and generate interrupts directed to an interrupt handler 652 in response to a RDMA access of a memory region/memory window (MR/MW), such as MR/MW 648-649 in memory 646. As shown, the message and data service 640 may be provided as part of the channel adapter 630 facilities. In addition, the channel adapter 630 facilities may include a scatter/gather data structure 642 for use in identifying local MR/MWs 648-649 to which and from which RDMA operations are to be performed, in a manner generally known in the art. Similarly, the second host data processing device B 615 may comprise a memory 660 having one or more MR/MWs 662, a plurality of consumer processes 670-672, channel adapter 680, message and data service 690, and scatter/gather data structure 692, among other elements not depicted.

In operation, when an upper layer protocol (ULP) consumer process, e.g., consumer process 620, of the first host data processing device A 610 wishes to read data from the second host data processing device B 615, the consumer process 620 generates a RDMA read work request (WR) and posts a corresponding work queue element (WQE) to a send queue (SQ) of a queue pair (QP), corresponding to the consumer process 620, in the channel adapter 630. The WQE includes an identifier of the memory region/memory window (MR/MW) 648 to which the data that is to be read from the second host data processing device B 615 is to be stored. This identifier may be, for example, an R_Key associated with the MR/MW 648. Moreover, the WQE includes an identifier of the MR/MW 662 on the remotely located host data processing device B 615 from which the data is to be read. The R_Keys to be used in such a RDMA operation are previously registered with each host data processing device 610 and 615 during an initial handshake operation, initialization operation, or the like, and are communicated to the other of the host data processing devices 610 and 615. The establishment and communication of R_Keys between host data processing devices is generally handled by the ULP processes and is generally known in the art.

In response to the posting of the RDMA Read Work Request to the SQ of the channel adapter 630 as a WQE, the channel adapter 630 converts the WQE into a RDMA read request message, having both the R_Keys for the MR/MWs 648 and 662, which is transmitted to the host data processing device B 615. The RDMA read request message is received by the host data processing device B 615 in its channel adapter 680 which processes the RDMA read request message within the hardware of the channel adapter 680 to identify the MR/MW 662. Essentially, the message and data service 690 identifies the message as a RDMA read request message and uses the scatter/gather data structure 692 to identify the MR/MW 662 associated with a R_Key forwarded in the RDMA read request message. It should be noted that the RDMA read request message is not processed in a receive queue of the channel adapter 680 since the operation is a remote DMA (RDMA) operation and the consumer processes 670-672 are not used in the processing of the RDMA operation. The queue pairs are only used to facilitate communication between ULP consumer processes; this is why the original RDMA read work request is posted to a SQ.

Using the R_Key associated with host data processing device B's 615 MR/MW 662, the channel adapter 680 automatically accesses the MR/MW 662 to read the data from the memory 660 in a RDMA read operation. The message and data service 690 may perform one or more signature checks and R_Key check operations to ensure that the R_Key is associated with a valid MR/MW 662, the first host data processing device A 610 is authorized to access the MR/MW 662, that the consumer process 620 is able to access the MR/MW 662, or the like. Assuming that all of the R_Key checks pass, the message and data service 690 of the channel adapter 680 performs a RDMA read of the data from the MR/MW 652 corresponding to host data processing device B's 615 R_Key specified in the RDMA read request message. The channel adapter 680 then packages the data along with the R_Key of the originating host data processing device A 610 into a RDMA read response message that is returned to the host data processing device A 610.

In response to receiving the RDMA read response message, the message and data service 640 identifies the RDMA read response message as a RDMA read response and uses the scatter/gather data structure 642 to identify the MR/MW 648 targeted by the R_Key in the RDMA read response message. The message and data service 640 of the channel adapter 630, in processing the RDMA read response message, identifies the included R_Key of the MR/MW 648. The message and data service 640 may perform one or more signature check and R_Key check operations to ensure that the R_Key is associated with a valid MR/MW 648, the consumer process 620 is able to access the MR/MW 648, or the like. Assuming that all of the R_Key checks pass, the message and data service 640 of the channel adapter 630 performs a direct data placement of the data associated with the RDMA read response message to the MR/MW 648 corresponding to first host data processing device A's 610 R_Key specified in the RDMA read response message.

The message and data service 640, in response to writing the data to MR/MW 648 and the various signature and R_Key checks passing, may automatically generate an event queue element (EQE) in the event queue data structure 650. The EQE contains the R_Key, and may contain a virtual address associated with the R_Key, a length of the RDMA message, protection domain, and/or other identifier of the MR/MW 648 targeted by the WQE. When the EQE is posted to the event queue data structure 650, the message and data service 640 further generates an interrupt that is sent to the interrupt handler 652. The interrupt handler 652 checks the event queue data structure 650 for the new EQE and uses the R_Key, a virtual address associated with the R_Key, a length of the RDMA message, protection domain, and/or other identifier of the MR/MW 648 in the EQE to map the event to an associated consumer process 620. For example, the channel adapter 630 may provide a memory translation and protection table (MTPT) mechanism that translates virtual addresses to physical addresses and further provides information regarding access rights for the physical addresses. The R_KEY may point to an entry in the MTPT. This entry may be used to identify a protection domain to map to the consumer process since each consumer process has a unique protection domain. The interrupt handler 652 then informs the consumer process 620, via interrupt processing, of the RDMA write operation completion to the MR/MW 648. Thereafter, the consumer process 620 may access the requested data from the MR/MW 648.

Thus, rather than having the second host data processing device B 615 transmit a response message to the first host data processing device A 610 for placement in a completion queue element (CQE) of a completion queue associated with the queue pair and having the consumer process 620 have to process the CQE in order to be informed of the completion of the RDMA write operation to the MR/MW 648, the illustrative embodiment provides mechanisms within the first host data processing device A 610 for automatically generating a notification of the direct data placement operation in response to the RDMA read response operation accessing the MR/MW 648. As a result, the operation of the first host data processing device A 610 may support the use of a Portals Application Program Interface (API) in a SAN architecture, such as InfiniBand™ or iWarp. That is, the mechanisms of the illustrative embodiment provide a functionality similar to that of the Portals API and thus, compatibility with the Portals API is made possible.

A similar operation is performed with regard to RDMA write operations, such as when the second host data processing device B 615 initiates a RDMA write to a MR/MW 648 on the first host data processing device A 610, as opposed to the first host data processing device A 610 initiating a RDMA read from the second host data processing device B 615. The RDMA write and the RDMA read are very similar in that data is sent from one host data processing device and written to a targeted MR/MW of the other host data processing device. However, there are differences in the operation due to the differences in which device originates the operation.

In the RDMA read operation described above, the first host data processing device A 610 informs the second host data processing device B 615 of the R_Key for the MR/MW 648 in the RDMA Read Request sent to the second host data processing device B 615. In the RDMA write operation, however, the second host data processing device B 615 must already know the R_Keys of MR/MWs 648-649 that are pre-assigned for RDMA operations in order to initiate a RDMA write to the MR/MW 648. In general, the InifiniBand™ specification provides facilities for informing other host data processing devices of the MR/MWs that may be used by them when performing RDMA operations. Thus, it is assumed for purposes of the description of the present invention that such facilities are in use and that the second host data processing device B 615 is informed of the R_Keys for the MR/MWs 648-649.

Thus, assume that MR/MW 648 is associated with the consumer process 620 on the first host data processing device A 610. If the consumer process 670 wishes to write data to the MR/MW 648 for use by the consumer process 620, the consumer process 670 generates and posts a WQE for the RDMA write operation to a send queue (SQ) of an appropriate queue pair of the channel adapter 680 for communicating with the channel adapter 630 of the first host data processing device A 610. The WQE generated and posted by the consumer process 670 includes the R_Key of the MR/MW 648 to which the data is to be written by the RDMA write operation and the L_Key of a local MR/MW 662 from which the data is to be read for writing to the MR/MW 648. The WQE causes a RDMA write message to be generated by the channel adapter 680, which includes reading the data from the local MR/MW 662 and packaging it into the RDMA write message. The RDMA write message is then transmitted to the host data processing device A 610.

The host data processing device A 610 receives the RDMA write message in the channel adapter 630 where the message and data service 640 identifies the R_Key of the MR/MW 648, performs the various signature and R_Key checks, and assuming all checks pass, performs a direct data placement operation to write the data into the MR/MW 648. As with the RDMA read operation, it should be noted that no queues are used in the receiving channel adapter 630 to process the RDMA message since the operation is a remote DMA operation that goes directly to the MR/MW 648 without having to be processed by an ULP consumer process. Also as with the RDMA read operation described above, the message and data service 640 may further write an EQE to the event queue data structure 650 and generate an interrupt to the interrupt handler 652.

Figure 7:
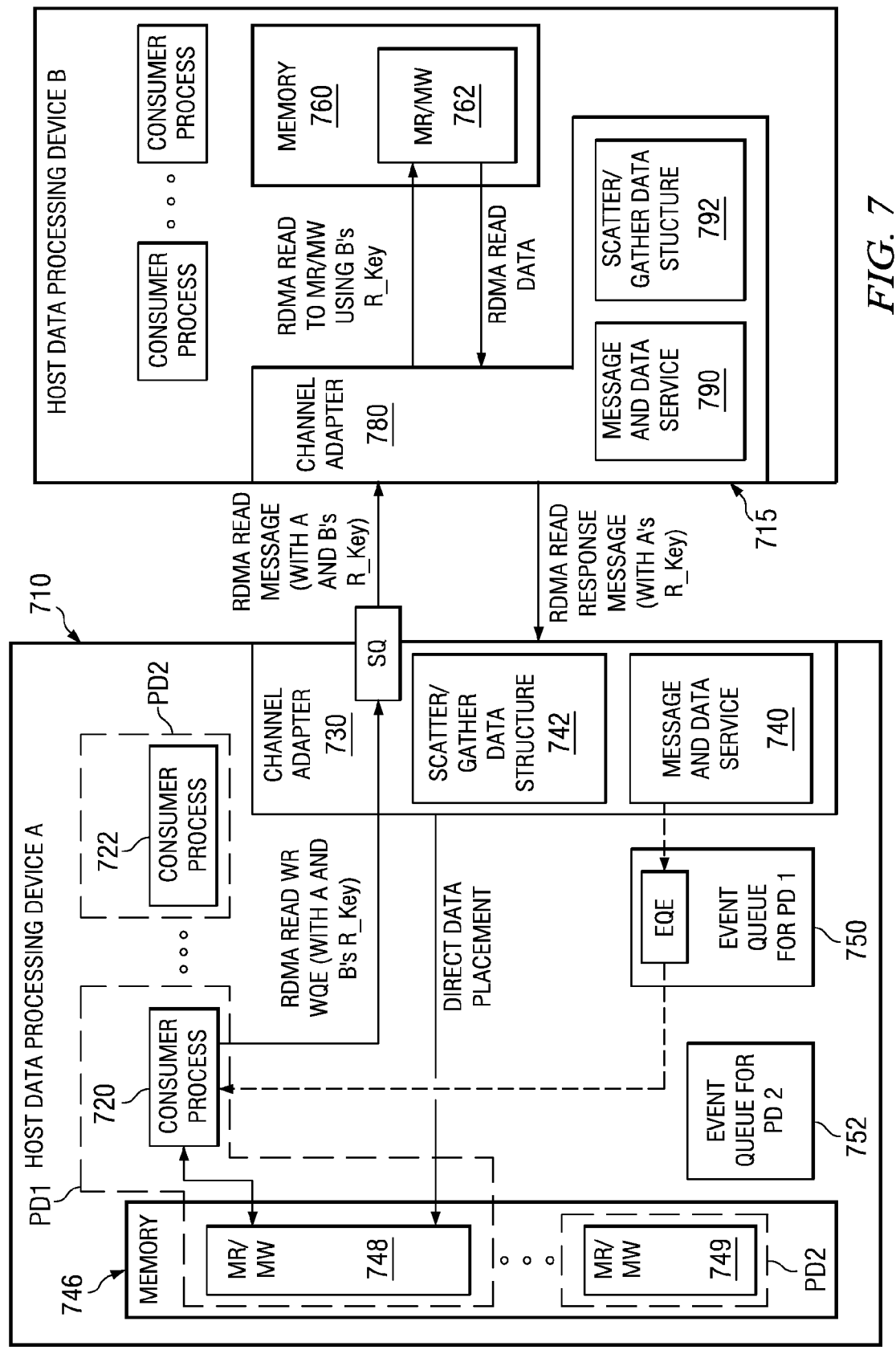
FIG. 7 is an exemplary block diagram illustrating a RDMA write operation in which separate MR/MW event queue data structures are utilized for various protection domains of a data processing system.

FIG. 7 is an exemplary block diagram illustrating a RDMA read operation in which separate MR/MW event queue data structures are utilized for various protection domains of a data processing system. In this alternative illustrative embodiment, rather than utilizing an interrupt handler to determine which consumer process to inform of the EQE being written to the event queue data structure, an association between the event queue data structure and the consumer process is automatically determined based on the protection domain to which the consumer process and MR/MW are associated.

As shown in FIG. 7, the consumer process 720, MR/MW 748 in memory 746, and the event queue data structure 750 are all associated with the same protection domain (PD1). There may be a single event queue data structure 750 associated with each protection domain currently supported by the first host data processing device A 710. Thus, as shown, a second protection domain (PD2) may be provided that comprises consumer process 722, MR/MW 749, and event queue data structure 752. The message and data service 740 is responsible for determining the protection domain associated with a target of a received RDMA read response message when processing the RDMA read response message. As defined by architecture specifications, access to MRs/MWs described in work requests (WRs) and RDMA requests are allowed only when the protection domain (PD) of the MR/MW, and of the queue pair (QP) that is processing the request, are identical. Thus, the PD is specified when the QP is created. A Memory Translation and Protection Table (MTPT) mechanism on the channel adapter keeps track of these associations. A WQE will be in a specific QP and the PD associated with that QP will also be associated with the WQE. Thus, the message and data service 740 is able to identify the PD of a target MR/MW 749 based on an entry, corresponding to the R_Key, in the MTPT mechanism present in the channel adapter as well as the PD associated with the QP of the send queue used to send the RDMA read message.

The message and data service 740, having determined the protection domain, may generate and post an event queue element (EQE) to a corresponding event queue data structure 750. The event queue data structure 750 is associated with the consumer process 720 via the protection domain and thus, the consumer process 720 may receive the EQE directly from the event queue data structure 750 without having to use an interrupt handler.

For example, since the event queue data structure 750 is created for a specific protection domain, the channel adapter 730 is able to verify that the protection domain in a MTPT entry associated with the R_Key matches the protection domain in the event queue data structure 750 context. This allows each event queue data structure 750 context to be mapped into consumer space so that the consumer process 720 can directly access EQEs in the corresponding event queue data structure 750. Since the event queue data structure 750 is associated with a single consumer process 720, the consumer process 720 trusts that the channel adapter 730 and its services already verified that this EQE belongs in that particular event queue data structure 750. This offloads the security verification to the channel adapter 730 hardware.

In operation, when an upper layer protocol (ULP) consumer process, e.g., consumer process 720, of the first host data processing device A 710 wishes to read data from the second host data processing device B 715, the consumer process 720 generates a RDMA read work request (WR) and posts a corresponding work queue element (WQE) to a send queue (SQ) of a queue pair (QP), corresponding to the consumer process 720, in the channel adapter 730. The WQE includes an identifier, e.g., an R_Key, of the memory region/memory window (MR/MW) 748 to which the data that is to be read from the second host data processing device B 715 is to be stored. Moreover, the WQE includes an identifier of the MR/MW 762 on the remotely located host data processing device B 715 from which the data is to be read.

In response to the posting of the RDMA Read Work Request to the SQ of the channel adapter 730 as a WQE, the channel adapter 730 generates a RDMA read request message, having both the R_Keys for the MR/MWs 748 and 762, which is then transmitted to the host data processing device B 715. The RDMA read request message is received by the host data processing device B 715 in its channel adapter 780 which processes the RDMA read request message within the hardware of the channel adapter 780 to identify the MR/MW 762. Essentially, the message and data service 790 identifies the message as a RDMA read request message and uses the scatter/gather data structure 792 to identify the MR/MW 762 associated with a R_Key forwarded in the RDMA read request message.

Using the R_Key associated with host data processing device B's 715 MR/MW 762, the channel adapter 780 automatically accesses the MR/MW 762 to read the data from the memory 760 in a RDMA read operation. The message and data service 790 may perform one or more signature checks and R_Key check operations to ensure that the R_Key is associated with a valid MR/MW 762, the first host data processing device A 710 is authorized to access the MR/MW 762, that the consumer process 720 is able to access the MR/MW 762, or the like. Assuming that all of the R_Key checks pass, the message and data service 790 of the channel adapter 780 reads the data from the MR/MW 762 corresponding to host data processing device B's 715 R_Key specified in the RDMA read request message. The channel adapter 780 then packages the data along with the R_Key of the originating host data processing device A 710 into a RDMA read response message that is returned to the host data processing device A 710.

In response to receiving the RDMA read response message, the message and data service 740 identifies the RDMA read response message as a RDMA read response and uses the scatter/gather data structure 742 to identifier the MR/MW 748 targeted by the R_Key in the RDMA read response message. The message and data service 740 of the channel adapter 730, in processing the RDMA read response message, identifies the included R_Key of the MR/MW 748. The message and data service 740 may perform one or more signature checks and R_Key check operations to ensure that the R_Key is associated with a valid MR/MW 748, the consumer process 720 is able to access the MR/MW 748, or the like. Assuming that all of the R_Key checks pass, the message and data service 740 of the channel adapter 730 performs a RDMA write of the data associated with the RDMA read response message to the MR/MW 748 corresponding to first host data processing device A's 710 R_Key specified in the RDMA read response message.

The message and data service 740, in response to writing the data to MR/MW 748 and the various signature and R_Key checks passing, may automatically identify the protection domain with which the data corresponds based on the R_Key specified in the RDMA read response message. As set forth in the InfiniBand™ specification, the R_Key identifies a MR/MW which in turn is associated with a particular protection domain. Thus, by identifying the MR/MW 748 based on the R_Key, the corresponding protection domain may be identified. For example, a Memory Translation and Protection Table (MTPT) mechanism of the channel adapter 730 contains, in each entry, an R_Key and a corresponding protection domain. Therefore each R_Key will reference an MTPT entry and the entry will have the protection domain associated with it.

Based on the identified protection domain, the message and data service 740 may identify an event queue data structure 750 corresponding to that protection domain. The message and data service 740 then generates an event queue element (EQE) in the event queue data structure 750. The EQE may contain the R_Key or other identifier of the MR/MW 748 targeted by the RDMA read response message.

Since the consumer process 720 is associated with the event queue data structure 750 via the protection domain, there is no need to identify which consumer process 720 to which the EQE should be provided; the association is already made by virtue of the protection domain. Therefore, the interrupt handler 652 used in the previously described illustrative embodiment (FIG. 6) may be eliminated in the operation of this alternative illustrative embodiment. Instead, the consumer process 720 may directly access the EQE from its associated event queue data structure 750. For example, as discussed above, the event queue data structure 750 context may be mapped to the consumer process space such that the consumer process 720 may poll the event queue data structure 750 for EQEs. In addition to polling, the consumer process 720 may also request an EQE by performing a call-back operation (e.g., waking up a thread when the event happens and then the thread may poll the event queue data structure 750).

Thus, this alternative illustrative embodiment eliminates the need to verify ownership of the MR/MW 748 via an R_Key or other identifier by way of an interrupt handler before notifying the associated consumer process 720 of the availability of the data in the MR/MW 748. As a result, the process by which the data becomes available to the consumer process 720 is made faster by eliminating the delay associated with interrupt processing.

It should be appreciated that, as with the previously described illustrative embodiment in FIG. 6, the mechanisms described above with regard to FIG. 7 may be used to perform RDMA write operations as well. The operation in such a case is virtually the same as described above with regard to FIG. 7 except for the differences described previously with regard to FIG. 6 due to a difference in the originator of the operation, i.e. host data processing device B 715 initiating the RDMA write operation rather than host data processing device A 710.

In a further alternative illustrative embodiment, rather than providing an event queue data structure for all of the consumer processes of the first host data processing system, or providing separate event queue data structures for separate protection domains of the first host data processing system, the asynchronous event handler already provided in the SAN architecture may be utilized for notifying the consumer process of the RDMA read/write operation completion. For example, in the InfiniBand™ specification version 1.2, page 631, an asynchronous event handler is described for handling asynchronous events. With the mechanisms of the illustrative embodiments, in response to the RDMA access of a MR/MW, the message and data service may automatically generate an event record that is posted to the asynchronous event handler. The event record may include the R_Key or other identifier of the MR/MW accessed by the RDMA read/write operation. The asynchronous event handler may then process the event record in a similar manner as the interrupt handler 652 of FIG. 6 processes the EQE of the event queue data structure 650 to thereby identify which consumer process to notify of the RDMA write operation completion.

Figure 8:
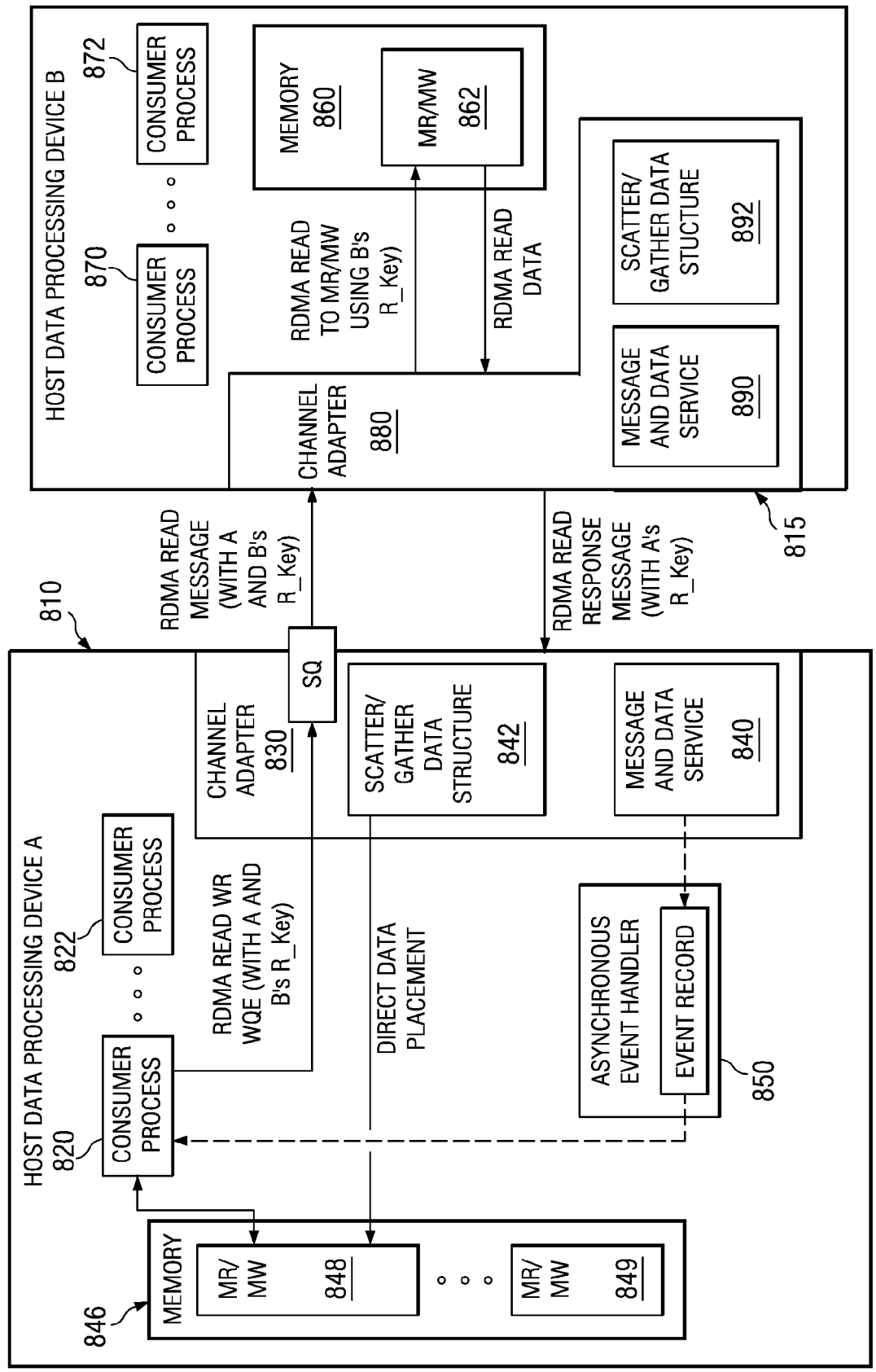
FIG. 8 is an exemplary diagram illustrating an exemplary embodiment in which an asynchronous event handler is utilized for notifying a consumer process of a completion of a RDMA.

This alternative illustrative embodiment, in which an asynchronous event handler is utilized for notifying a consumer process of a completion of a RDMA operation is illustrated in FIG. 8. As shown in FIG. 8, the first host data processing device A 810 includes similar elements as described above with regard to FIGS. 6 and 7 but instead of using event queue data structures and interrupt handlers, the illustrative embodiment shown in FIG. 8 utilizes an asynchronous event handler 850 for automatic notification of consumer processes. The message and data service 840 interacts with the asynchronous event handler 850 to post event records for handling by the asynchronous event handler 850. In response to receiving the RDMA read response message from the second host data processing device B 815 and writing the data received in the RDMA read response message into the MR/MW 848, the message and data service 840 generates an event record that includes the R_Key or other identifier of the MR/MW 848. The message and data service 840 posts the event record to the asynchronous event handler 850 which processes the event record to identify the consumer process 820 associated with the MR/MW 848 to which the data was written. The asynchronous event handler 850 may then notify the identified consumer process 820 of the event, i.e. the completion of the RDMA write operation to the MR/MW 848, such that the consumer process 820 may then access the requested data from the MR/MW 848.

Thus, with the illustrative embodiment of FIG. 8, rather than using a new type of queue data structure, the illustrative embodiment of FIG. 8 takes advantage of an existing mechanism in the architecture specification, referred to as the asynchronous event handler, to facilitate the operations of the illustrative embodiments. From the architecture specifications, a consumer process must register a handler by setting an asynchronous event handler to be notified when an asynchronous event has occurred. With the illustrative embodiment, when an event is posted in the asynchronous event handler queue, the asynchronous event handler notifies the registered handler. The consumer process then uses the R_Key in the event to check which MR/MW was accessed.

In yet another alternative illustrative embodiment, a WQE may be posted to the RQ of a queue pair for use in automatically generating a CQE in response to receiving a WQE from a client data processing device. With this alternative illustrative embodiment, no additional event queue data structures are required and instead, the queue structures already supported by existing architecture specifications are utilized to inform the consumer process of completion of a RDMA data transfer. This particular alternative illustrative embodiment assumes that the consumer process knows ahead of time that an MR/MW will be accessed and thus, posts a WQE in the RQ. The channel adapter consumes this RQ and, in response, generates a CQE that informs the consumer process of the completion of the RDMA data transfer.

Figure 9:
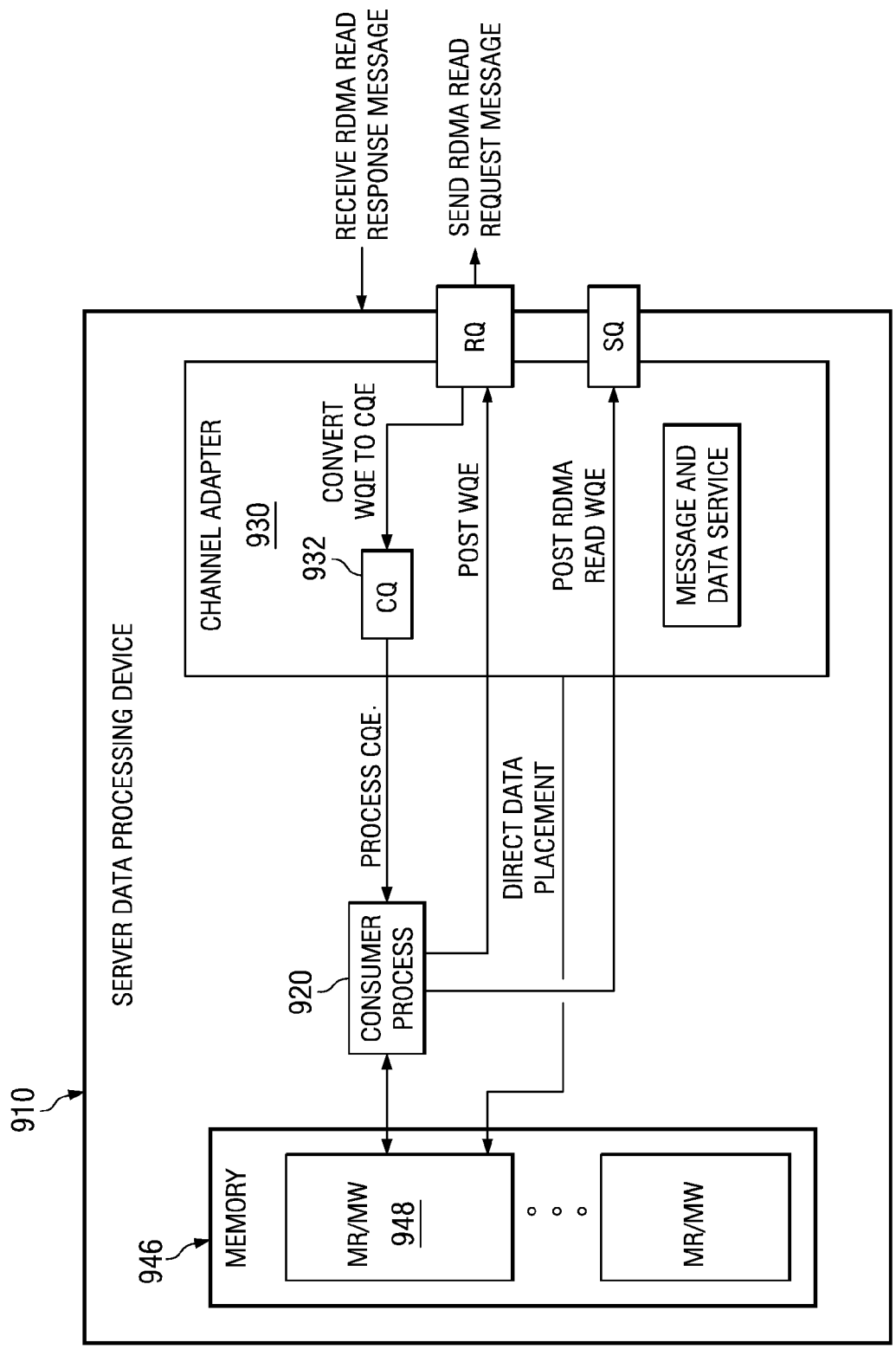
FIG. 9 is an exemplary diagram of an alternative illustrative embodiment in which a WQE of a RQ is used to automatically generate a CQE for notifying a consumer process of the completion of a RDMA operation.

FIG. 9 is an exemplary diagram of an alternative illustrative embodiment in which a WQE of a RQ is used to automatically generate a CQE for notifying a consumer process of the completion of a RDMA operation. As shown in FIG. 9, when the consumer process 920, running on the server data processing device 910, sends a RDMA read request message to the second host data processing device (not shown) via the SQ as in the manner previously described above, the consumer process 920 further posts a WQE to the RQ. This WQE in the RQ is used for automatic creation of a CQE in the CQ 932 in response to the channel adapter 930 consuming the WQE in the RQ. When a RDMA read response message is received in the channel adapter 930 from the second host data processing device (not shown), the data corresponding to the received RDMA read response message is written to the MR/MW 948 of memory 946 in a manner similar to that described above. In addition, a WQE posted to the RQ by the consumer process 920 is consumed by the channel adapter 930 and a completion queue element (CQE) is posted to the CQ associated with the RQ that includes the R_Key of the MR/MW 948 to which the data from the WQE is written. The functionality of consuming a WQE posted to a RQ and generating a CQE after the work specified is done is generally known in the art and is part of the specification for how a channel adapter should operate. However, prior to the present invention, such functionality has not been adapted and used for the explicit purpose of notifying a consumer process of completion of a RDMA access to a MR/MW.

After the CQE is created and posted to the CQ, the consumer process 920 may then be notified, by processing of the CQE in a manner generally described in the SAN architecture specifications, of the completion of the RDMA write operation to the MR/MW 948 and thereafter, may access the requested data. The WQE posted to the RQ, and thus the CQE created based on the consumption of the RQ, are of a new type not previously seen in the known architecture specifications. The WQE and CQE contain the information the consumer process 920 needs to know to determine which MR/MW 948 was altered, e.g., the R_Key, virtual address, length, and/or the like. Thus, when the consumer process 920 accesses the CQE, the consumer process 920 may identify the MR/MW 948 based on this information and thereafter, access the data written to the MR/MW 948.

FIGS. 10-13 are flowcharts for outlining exemplary operations of illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

It should be appreciated that, while the flowcharts in FIGS. 10-13 are directed to performing a RDMA read operation, the illustrative embodiments are not limited to such. Rather, the mechanisms of the illustrative embodiments, and similar operations to that outlined in FIGS. 10-13, may be used to perform other RDMA operations, such as a RDMA write operation. The modifications to the operations shown in FIGS. 10-13 are apparent to those of ordinary skill in the art in view of the discussion of modifications for RDMA write operations described previously above. Thus, the RDMA read operation has been chosen to illustrate the more complex situation for performing RDMA operations and is not intended to state or imply any limitation with regard to the types of RDMA operations with which the mechanisms of the illustrative embodiments may be utilized.

Figure 10:
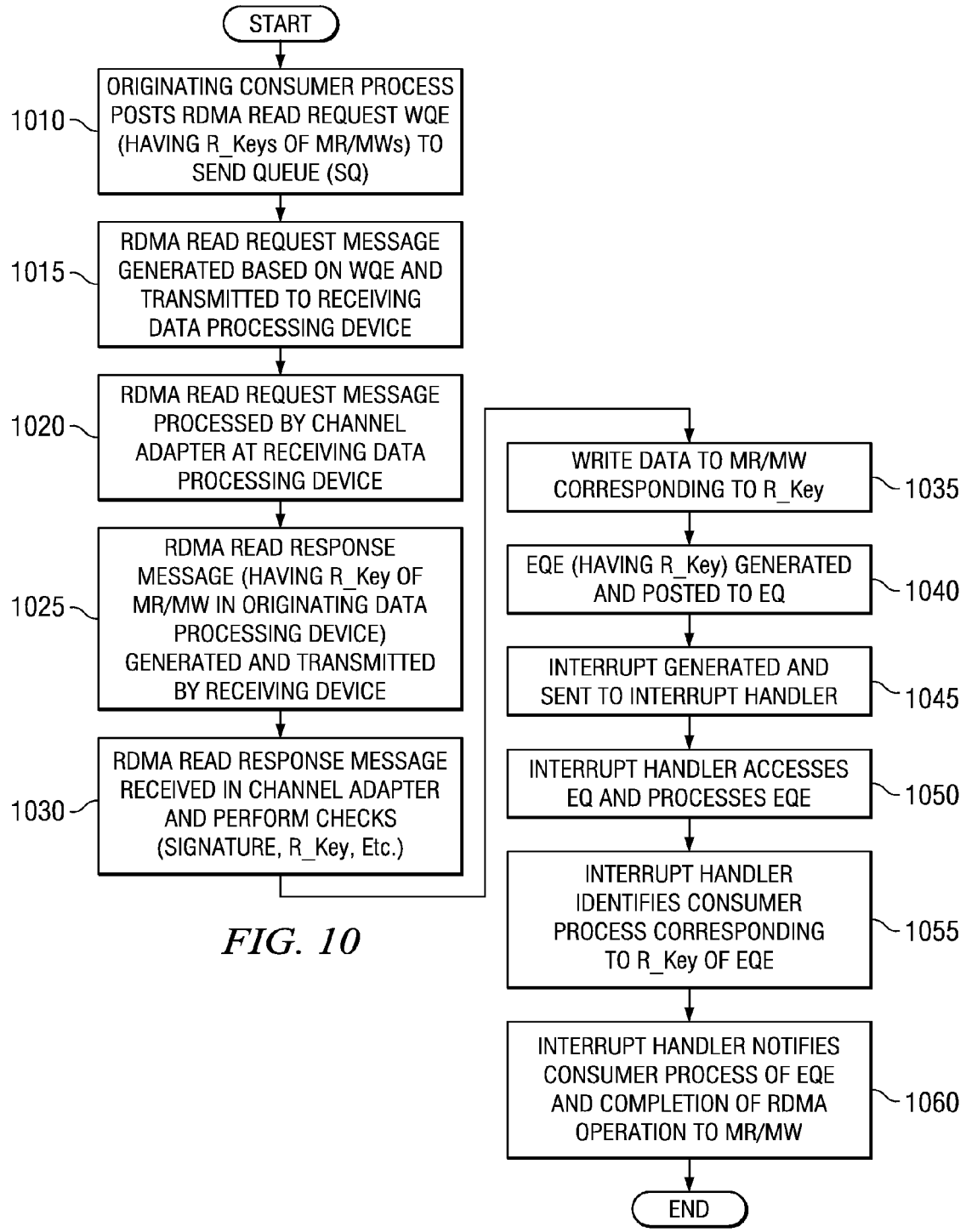
FIG. 10 is a flowchart outlining an exemplary operation for notifying a consumer process of completion of a RDMA operation using a single event queue data structure for all consumer processes in accordance with one illustrative embodiment.

FIG. 10 is a flowchart outlining an exemplary operation for notifying a consumer process of completion of a RDMA read operation using a single event queue data structure for all consumer processes in accordance with one illustrative embodiment. As shown in FIG. 10, the operation starts with an originating consumer process posting a RDMA read request WQE to a send queue (SQ) (step 1010). In accordance with the illustrative embodiments, the WQE posted to the SQ includes a first R_Key of a MR/MW from which the data is to be read on a remote data processing device, and a second R_Key of a MR/MW to which data is to be written on the originating data processing device.

A RDMA read request message is generated by the channel adapter of the originating data processing device based on the information provided in the WQE. The RDMA Read Request message is then transmitted to the receiving data processing device (step 1015). The RDMA read request message is processed by the channel adapter of the receiving data processing device (step 1020) and a RDMA read response message, having the second R_Key of the MR/MW to which the data is to be written, and the data read from the MR/MW specified by the first R_Key, is generated and transmitted by the receiving data processing device back to the originating data processing device (step 1025).

The RDMA read response message is received in the channel adapter of the originating data processing device and appropriate signature, R_Key, and other checks are performed (step 1030). Assuming all checks pass, the data in the RDMA read response message is written to the MR/MW in the originating data processing device corresponding to the second R_Key, such as by performing a direct data placement operation to the MR/MW (step 1035).

A message and data service of the channel adapter generates an event queue element (EQE) having the second R_Key specified in the RDMA read response message and posts the EQE to an event queue (EQ) data structure (step 1040). The message and data service further generates an interrupt and sends the interrupt to an interrupt handler (step 1045). The interrupt handler accesses the EQ and processes the EQE in response to the interrupt (step 1050). In processing the EQE, the interrupt handler identifies the consumer process corresponding to the second R_Key specified in the EQE (step 1055). The interrupt handler then notifies the identified consumer process of the EQE and the completion of the RDMA operation to the MR/MW (step 1060) and the operation terminates. The consumer process may then continue its operation with regard to the MR/MW, e.g., accessing data written to the MR/MW by the RDMA read operation.

Figure 11:
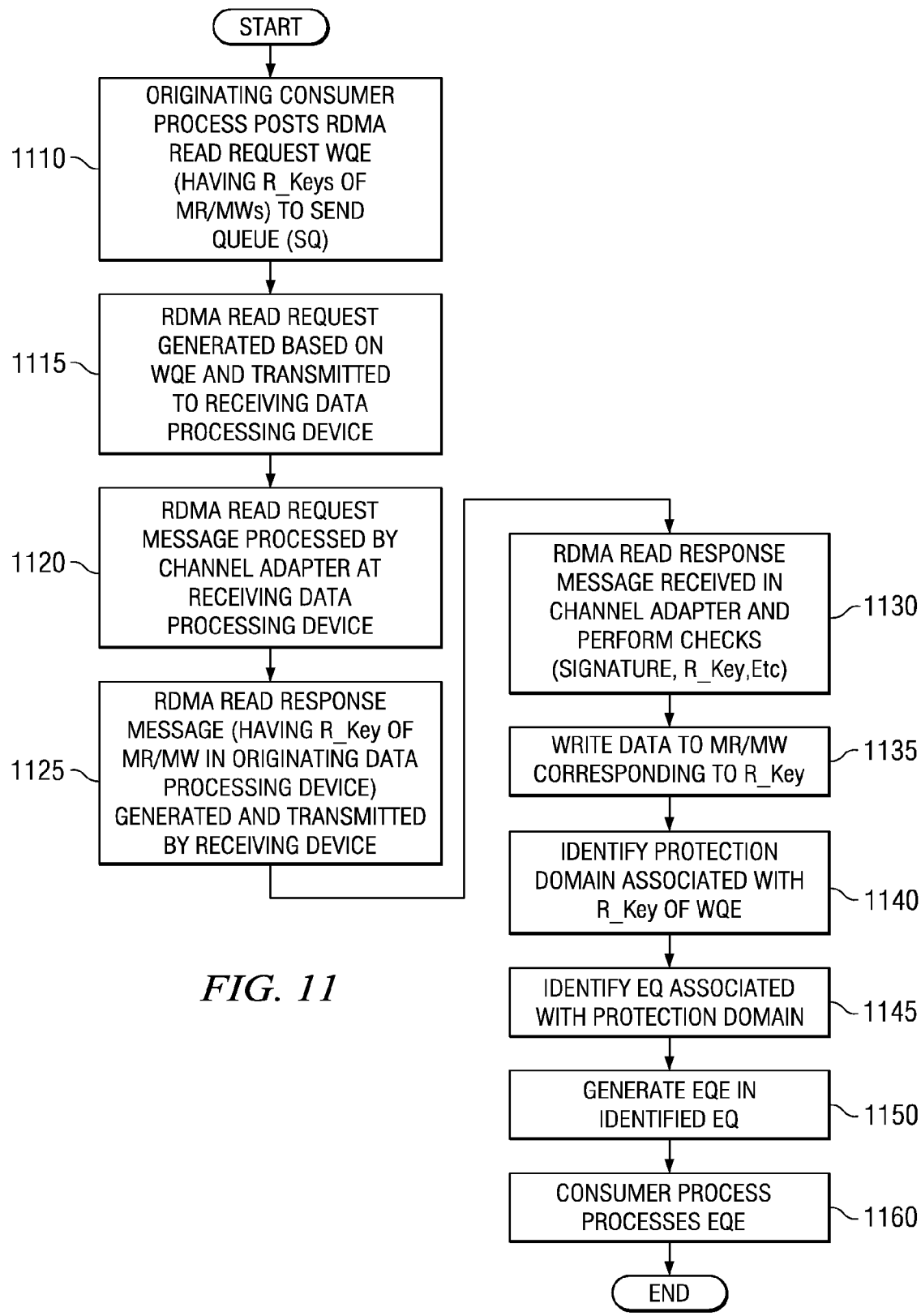
FIG. 11 is a flowchart outlining an exemplary operation for notifying a consumer process of completion of a RDMA operation using separate event queue data structures for each protection domain in accordance with one illustrative embodiment.

FIG. 11 is a flowchart outlining an exemplary operation for notifying a consumer process of completion of a RDMA read operation using separate event queue data structures for each protection domain in accordance with one illustrative embodiment. As shown in FIG. 11, the operation starts with an originating consumer process posting a RDMA read request WQE to a send queue (SQ) (step 1110). In accordance with the illustrative embodiments, the WQE posted to the SQ includes a first R_Key of a MR/MW from which the data is to be read on a remote data processing device, and a second R_Key of a MR/MW to which data is to be written on the originating data processing device.

A RDMA read request message is generated by the channel adapter of the originating data processing device based on the information in the WQE. The RDMA Read Request Message is then transmitted to the receiving data processing device (step 1115). The RDMA read request message is processed by the channel adapter of the receiving data processing device (step 1120) and a RDMA read response message, having the second R_Key of the MR/MW to which the data is to be written, and the data read from the MR/MW specified by the first R_Key, is generated and transmitted by the receiving data processing device back to the originating data processing device (step 1125).

The RDMA read response message is received in the channel adapter of the originating data processing device and appropriate signature, R_Key, and other checks are performed (step 1130). Assuming all checks pass, the data in the RDMA read response message is written to the MR/MW in the originating data processing device corresponding to the second R_Key, such as by performing a direct data placement operation to the MR/MW (step 1135).

A message and data service of the channel adapter in the originating data processing device identifies a protection domain associated with the second R_Key specified in the RDMA read response message (step 1140). The message and data service further identifies an EQ associated with the identified protection domain (step 1145). The message and data service generates an EQE and posts the EQE in the identified EQ (step 1150). The consumer process may then process the EQE in the EQ by virtue of the association via the protection domain (step 1160) and the operation terminates. The consumer process may then continue its operation with regard to the MR/MW, e.g., accessing data written to the MR/MW by the RDMA read operation.

Figure 12:
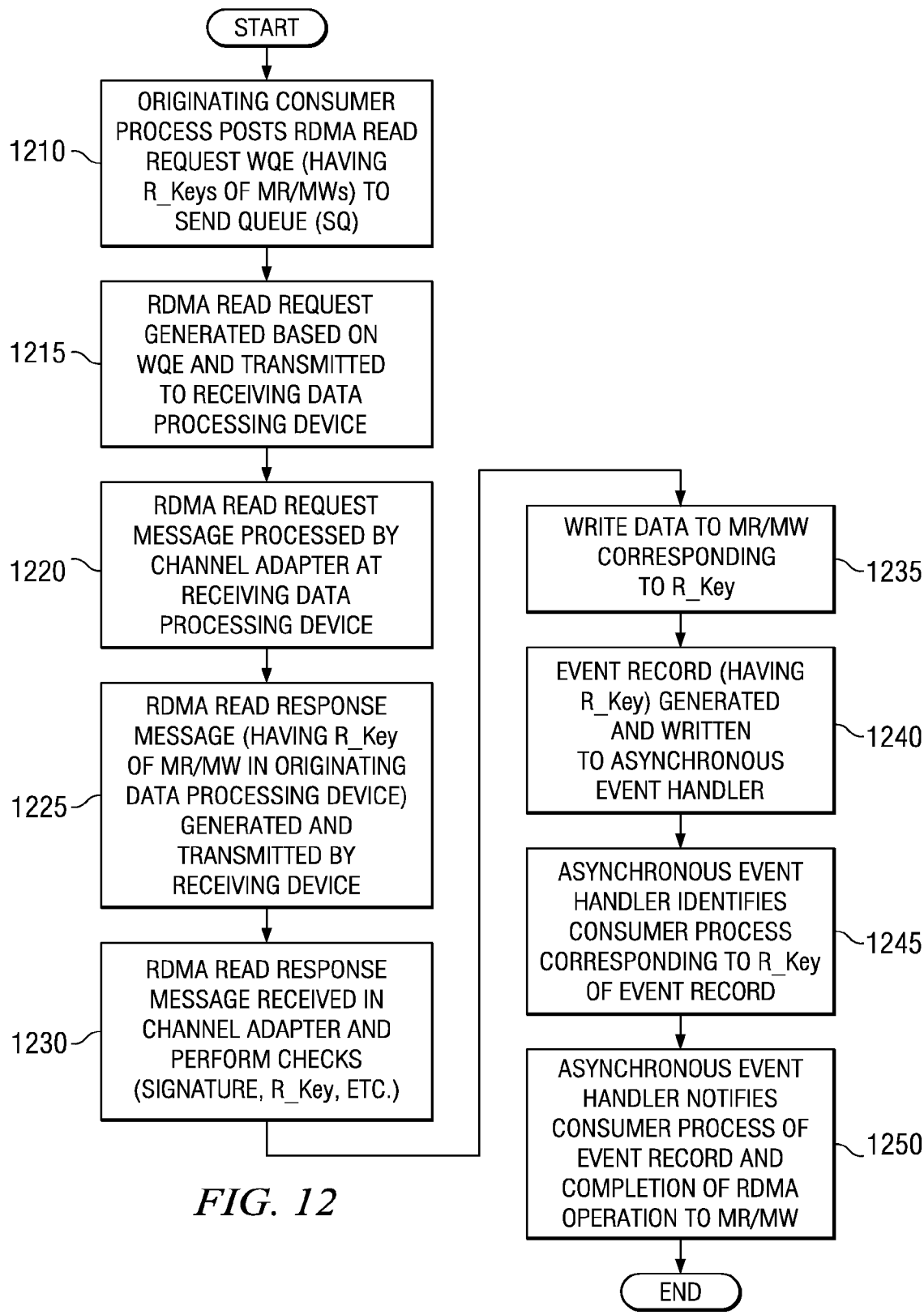
FIG. 12 is a flowchart outlining an exemplary operation for notifying a consumer process of completion of a RDMA operation using an asynchronous event handler in accordance with one illustrative embodiment.

FIG. 12 is a flowchart outlining an exemplary operation for notifying a consumer process of completion of a RDMA read operation using an asynchronous event handler in accordance with one illustrative embodiment. As shown in FIG. 12, the operation starts with an originating consumer process posting a RDMA read request WQE to a send queue (SQ) (step 1210). As discussed above, the RDMA read request WQE may include a first R_Key of the MR/MW on the target data processing device from which data is to be read and a second R_Key of the MR/MW to which data is to be written on the originating data processing device.

A RDMA read request message is generated by the channel adapter of the originating data processing device based on the information provided in the WQE. The RDMA Read Request message is then transmitted to the receiving device (step 1215). The RDMA read request message is processed by the channel adapter at the receiving device (step 1220) and a RDMA read response message, having the same second R_Key of the MR/MW to which data is to be written in the originating data processing device, is generated and transmitted by the receiving data processing device (step 1225).

The RDMA read response message is received in the channel adapter of the originating data processing device and appropriate signature, R_Key, and other checks are performed (step 1230). Assuming all checks pass, the data in the RDMA read response message is written to the MR/MW corresponding to the second R_Key (step 1235).

A message and data service generates an event record having the second R_Key specified in the RDMA read response message and posts the event record to an asynchronous event handler (step 1240). The asynchronous event handler identifies the consumer process corresponding to the second R_Key of the event record (step 1245). The asynchronous event handler notifies the identified consumer process of the event record and the completion of the RDMA read operation (step 1250) and the operation terminates. The consumer process may then continue its operation with regard to the MR/MW, e.g., accessing data written to the MR/MW by the RDMA read operation.

Figure 13:
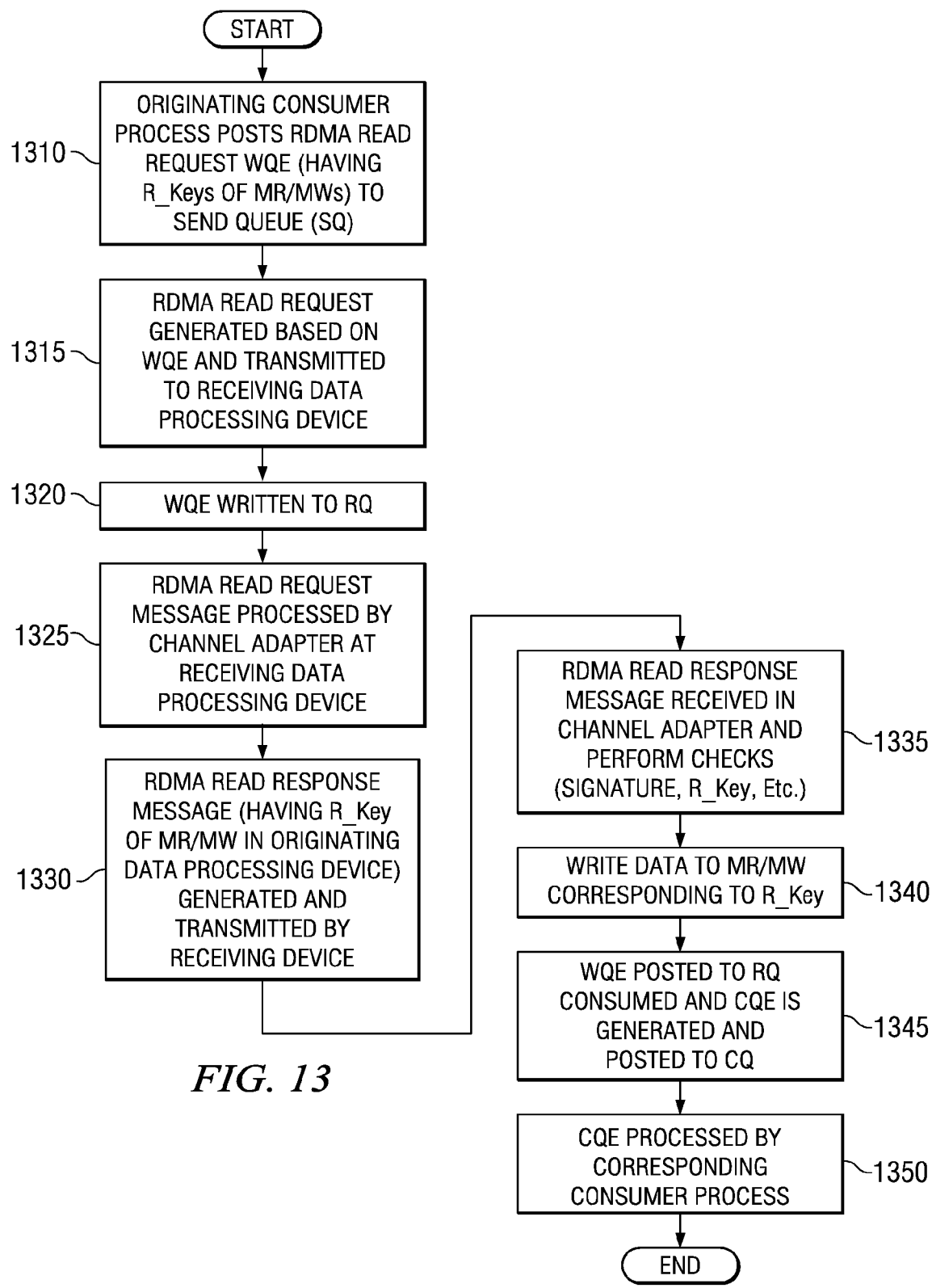
FIG. 13 is a flowchart outlining an exemplary operation for notifying a consumer process of completion of a RDMA operation using a WQE posted to a RQ for conversion to a CQE in accordance with one illustrative embodiment.
Figure 14:
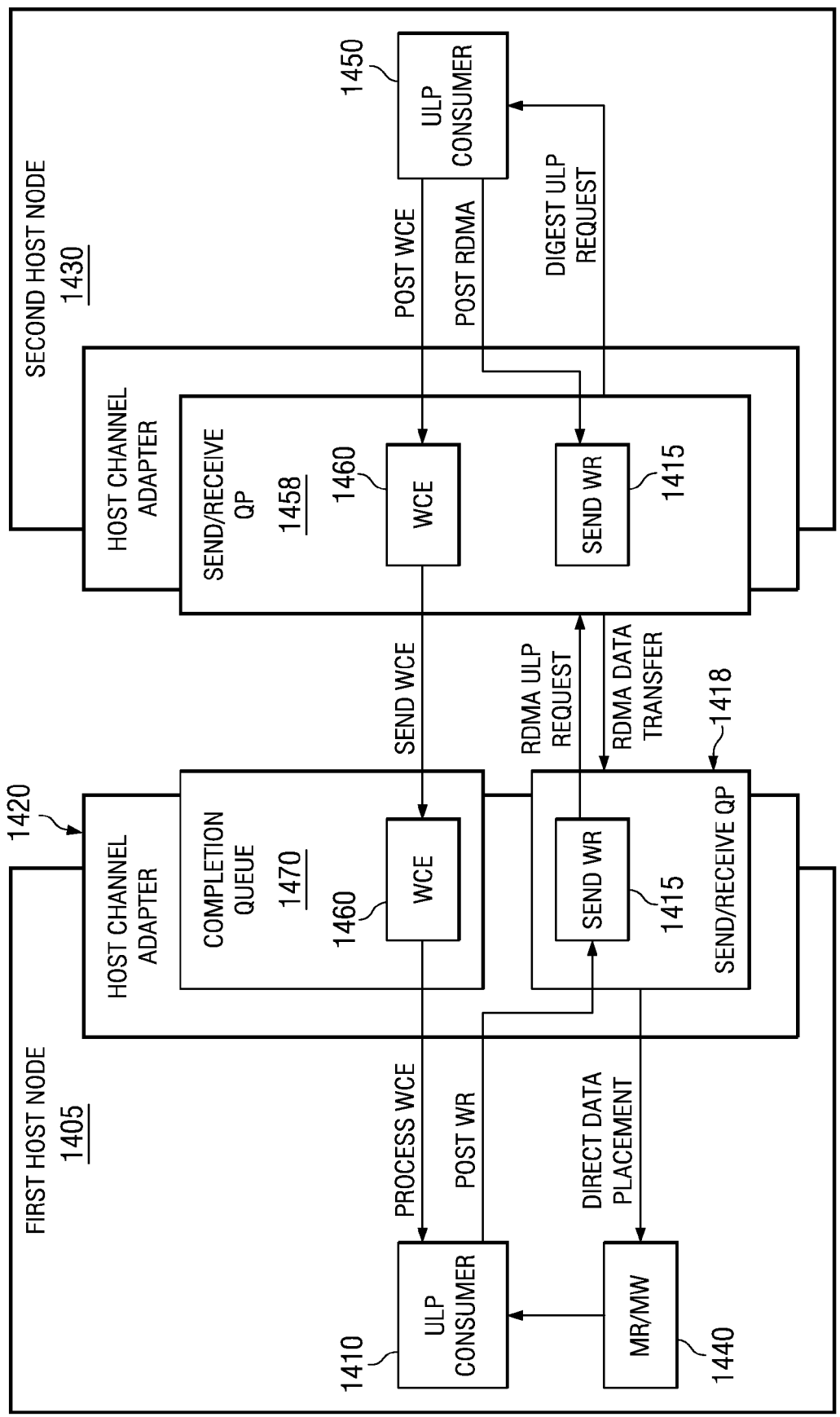
FIG. 14 is an exemplary diagram illustrating a typical RDMA transaction oriented protocol exchange between a first host node and a second host node in a SAN.
Figure 15:
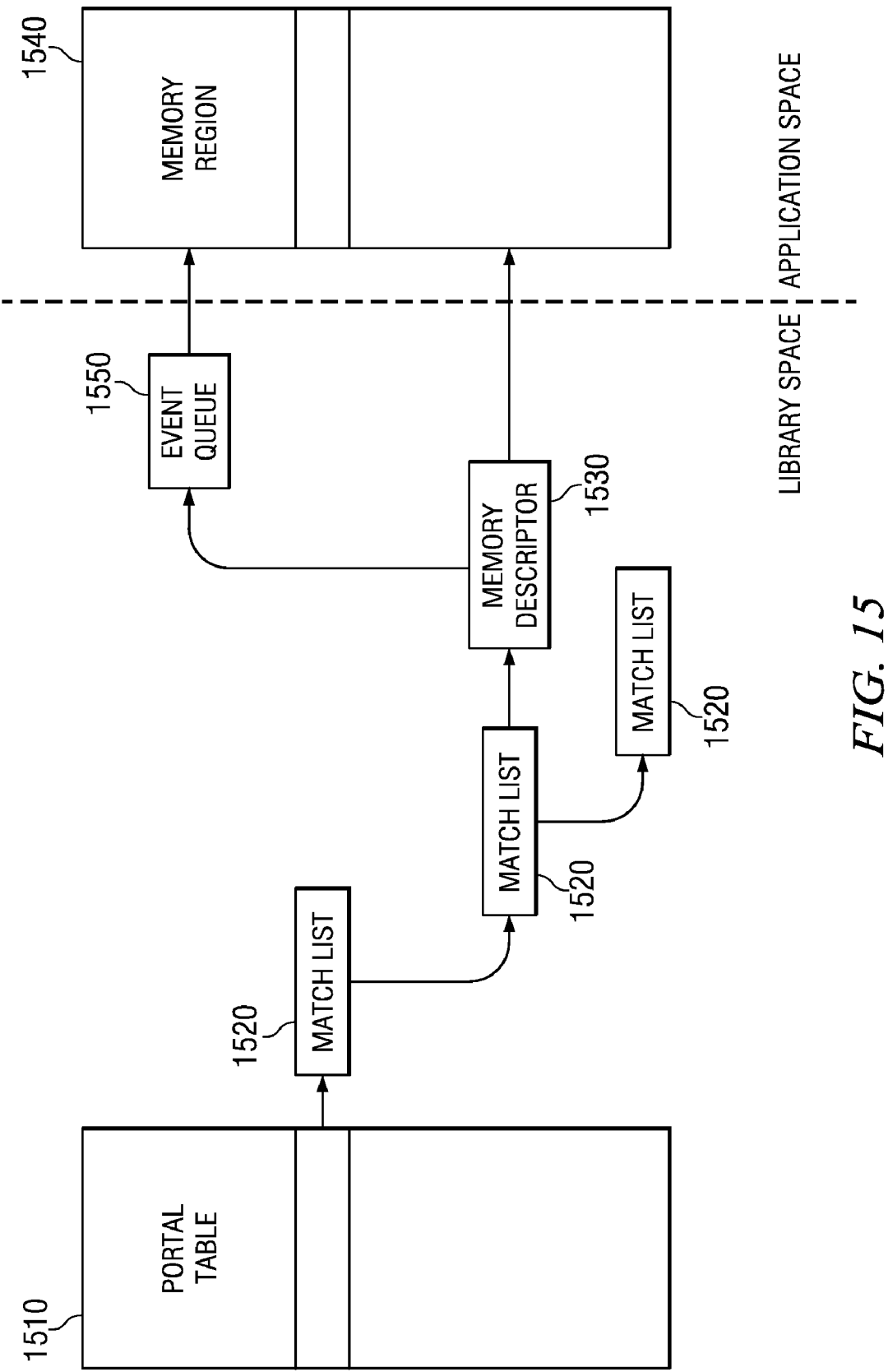
FIG. 15 is an exemplary diagram illustrating the use of a Portal id and portal table to identify a memory region.

FIG. 13 is a flowchart outlining an exemplary operation for notifying a consumer process of completion of a RDMA read operation using a WQE posted to a RQ for the purpose of generating a CQE in accordance with one illustrative embodiment. As shown in FIG. 13, the operation starts with an originating consumer process posting a RDMA read request WQE to a send queue (SQ) (step 1310). The RDMA read request WQE may include a first R_Key identifying a MR/MW on a target data processing device from which data is to be read and a second R_Key identifying a MR/MW of the originating data processing device to which the data is to be written.

A RDMA Read Request message is generated by the channel adapter of the originating data processing device based on the information provided in the WQE and is transmitted to the receiving data processing device via the send queue (step 1315). In addition, a WQE is posted, or written, to the receive queue (step 1320). The RDMA Read Request message is processed by the channel adapter at the receiving data processing device (step 1325) and a RDMA read response message, having the same second R_Key, is generated and transmitted by the receiving data processing device (step 1330).

The RDMA read response message is received in the channel adapter of the originating data processing device and appropriate signature, R_Key, and other checks are performed (step 1335). Assuming all checks pass, the data in the RDMA read response message is written to the MR/MW corresponding to the second R_Key (step 1340).

A WQE posted to the RQ is then consumed and a completion queue element (CQE) is generated and posted in a completion queue (CQ) corresponding to the queue pair of the RQ (step 1345). The CQE is processed by a corresponding consumer process (step 1350) and the operation terminates. The consumer process may then continue its operation with regard to the MR/MW, e.g., accessing data written to the MR/MW by the RDMA read operation.

Thus, the illustrative embodiments described herein provide facilities for informing a consumer process of an access to a memory region/memory window in response to the access occurring. The various mechanisms may include event queues, interrupt handlers, asynchronous event queues, event queues for each protection domain, automatic generation of completion queue elements, and/or the like. The mechanisms of the illustrative embodiments provide a functionality compatible with the Portals API in a SAN infrastructure, such as the InfiniBand™ or iWarp™ SAN infrastructures.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for informing a process of an access to a pre-allocated memory region/memory window (MR/MW) of the data processing system, comprising:

receiving, in a channel adapter of the data processing system, a Remote Direct Memory Access (RDMA) message, from an external computing device, for accessing a MR/MW of the data processing system identified by an identifier of the MR/MW included in the RDMA message;

processing the RDMA message in the channel adapter to write data associated with the RDMA message to the MR/MW identified by the identifier;

automatically notifying, by logic of the channel adapter of the data processing system, a process associated with the MR/MW, executing on the data processing system, of the write of data to the MR/MW in response to the writing of the data to the MR/MW, wherein the logic of the channel adapter of the data processing system performs the automatic notification without waiting for receipt of a completion queue entry message from the external computing device;

processing, by the process, the data in the MR/MW in response to the notification;

posting a work queue element (WQE) to a receive queue of the channel adapter; and generating a completion queue element (CQE) in a completion queue of the channel adapter, based on information in the WQE, in response to receiving the RDMA message for accessing the MR/MW, wherein automatically notifying the process associated with the MR/MW of the write of data to the MR/MW comprises processing, by the process, the CQE.

2. A method, in a data processing system, for informing a process of an access to a pre-allocated memory region/memory window (MR/MW) of the data processing system, comprising:

receiving, in a channel adapter, a Remote Direct Memory Access (RDMA) message for accessing a MR/MW of the data processing system identified by an identifier of the MR/MW included in the RDMA message;

processing the RDMA message in the channel adapter to write data associated with the RDMA message to the MR/MW identified by the identifier;

automatically notifying a process associated with the MR/MW of the write of data to the MR/MW in response to the writing of the data to the MR/MW;

processing, by the process, the data in the MR/MW in response to the notification, wherein automatically notifying the process associated with the MR/MW of the write of data to the MR/MW comprises posting an event queue element (EQE) to an event queue (EQ);

posting a work queue element (WQE) to a receive queue of the channel adapter; and generating a completion queue element (CQE) in a completion queue of the channel adapter, based on information in the WQE, in response to receiving the RDMA message for accessing the MR/MW, wherein automatically notifying the process associated with the MR/MW of the write of data to the MR/MW comprises processing, by the process, the CQE.

3. The method of claim 2, wherein automatically notifying the process associated with the MR/MW of the write of data to the MR/MW further comprises:

generating an interrupt to an interrupt handler;

processing the interrupt to identify the process associated with the MR/MW based on the identifier; and sending a notification to the process that an EQE is ready for processing in the EQ in response to processing the interrupt.

4. The method of claim 2, wherein the EQ receives EQEs associated with write operations to all MR/MWs of the data processing system.

5. The method of claim 2, wherein the EQ is associated with a protection domain of the data processing system such that there are a plurality of EQs, one for each protection domain of the data processing system.

6. The method of claim 5, wherein automatically notifying the process associated with the MR/MW of the write of data to the MR/MW further comprises:

identifying a protection domain associated with the MR/MW based on the identifier;

identifying an EQ associated with the identified protection domain; and posting the EQE to the EQ associated with the identified protection domain.

7. The method of claim 1, wherein automatically notifying the process associated with the MR/MW of the write of data to the MR/MW comprises posting an event record to an asynchronous event handler of the data processing system.

8. The method of claim 7, wherein automatically notifying the process associated with the MR/MW of the write of data to the MR/MW further comprises:

identifying, by the asynchronous event handler, the process associated with the MR/MW based on the identifier; and sending a notification to the process that the event record is available for processing in the asynchronous event handler.

9. The method of claim 1, wherein the RDMA message for accessing the MR/MW is a RDMA message generated by an external device in response to a RDMA read work request transmitted to the external device by the data processing system.

10. A computer program product comprising a computer readable storage device having a computer readable program, wherein the computer readable program, when executed on a data processing system, causes the data processing system to:

receive, in a channel adapter of the data processing system, a Remote Direct Memory Access (RDMA) message, from an external computing device, for accessing a memory region/memory window (MR/MW), of the data processing system, identified by an identifier of the MR/MW included in the RDMA message;

process the RDMA message in the channel adapter to write data associated with the RDMA message to the MR/MW identified by the identifier;

automatically notify, by logic of the channel adapter of the data processing system, a process associated with the MR/MW, executing on the data processing system, of the write of data to the MR/MW in response to the writing of the data to the MR/MW, wherein the logic of the channel adapter of the data processing system performs the automatic notification without waiting for receipt of a completion queue entry message from the external computing device;

process, by the process, the data in the MR/MW in response to the notification;

post a work queue element (WQE) to a receive queue of the channel adapter; and generate a completion queue element (CQE) in a completion queue of the channel adapter, based on information in the WQE, in response to receiving the RDMA message for accessing the MR/MW, wherein automatically notifying the process associated with the MR/MW of the write of data to the MR/MW comprises processing, by the process, the CQE.

11. A computer program product comprising a computer readable storage device having a computer readable program, wherein the computer readable program, when executed on a data processing system, causes the data processing system to:
 receive, in a channel adapter, a Remote Direct Memory Access (RDMA) message for accessing a memory region/memory window (MR/MW), of the data processing system, identified by an identifier of the MR/MW included in the RDMA message;
 process the RDMA message in the channel adapter to write data associated with the RDMA message to the MR/MW identified by the identifier;
 automatically notify a process associated with the MR/MW of the write of data to the MR/MW in response to the writing of the data to the MR/MW;
 process, by the process, the data in the MR/MW in response to the notification, wherein the computer readable program causes the data processing system to automatically notify the process associated with the MR/MW of the write of data to the MR/MW by posting an event queue element (EQE) to an event queue (EQ);
 post a work queue element (WQE) to a receive queue of the channel adapter; and generate a completion queue element (CQE) in a completion queue of the channel adapter, based on information in the WQE, in response to receiving the RDMA message for accessing the MR/MW, wherein automatically notifying the process associated with the MR/MW of the write of data to the MR/MW comprises processing, by the process, the CQE.

12. The computer program product of claim 11, wherein the computer readable program further causes the data processing system to automatically notify the process associated with the MR/MW of the write of data to the MR/MW by:
 generating an interrupt to an interrupt handler;
 processing the interrupt to identify the process associated with the MR/MW based on the identifier; and
 sending a notification to the process that an EQE is ready for processing in the EQ in response to processing the interrupt.

13. The computer program product of claim 12, wherein the EQ receives
 EQEs associated with write operations to all MR/MWs of the data processing system.

14. The computer program product of claim 11, wherein the EQ is associated with a protection domain of the data processing system such that there are a plurality of EQs, one for each protection domain of the data processing system.

15. The computer program product of claim 14, wherein the computer readable program further causes the data processing system to automatically notify the process associated with the MR/MW of the write of data to the MR/MW by:
 identifying a protection domain associated with the MR/MW based on the identifier;
 identifying an EQ associated with the identified protection domain; and
 posting the EQE to the EQ associated with the identified protection domain.

16. The computer program product of claim 10, wherein the computer readable program causes the data processing system to automatically notify the process associated with the MR/MW of the write of data to the MR/MW by posting an event record to an asynchronous event handler of the data processing system.

17. The computer program product of claim 16, wherein the computer readable program further causes the data processing system to automatically notify the process associated with the MR/MW of the write of data to the MR/MW by:
 identifying, by the asynchronous event handler, the process associated with the MR/MW based on the identifier; and
 sending a notification to the process that the event record is available for processing in the asynchronous event handler.

18. A data processing system, comprising:
 a processor;
 a memory coupled to the processor, the memory comprising one or more memory regions/memory windows (MR/MWs); and
 a channel adapter coupled to the processor and the memory, wherein the channel adapter:
 receives a Remote Direct Memory Access (RDMA) message, from an external computing device, for accessing a MR/MW, of the data processing system, identified by an identifier of the MR/MW included in the RDMA message,
 processes the RDMA message to write data associated with the RDMA message to the MR/MW identified by the identifier,
 automatically notify a process, executing on the data processing system, associated with the MR/MW of the write of data to the MR/MW in response to the writing of the data to the MR/MW, wherein the process processes the data in the MR/MW in response to the notification, and wherein the channel adapter of the data processing system automatically notifies the process without waiting for receipt of a completion queue entry message from the external computing device,
 post a work queue element (WQE) to a receive queue of the channel adapter, and
 generate a completion queue element (CQE) in a completion queue of the channel adapter, based on information in the WQE, in response to receiving the RDMA message for accessing the MR/MW, wherein automatically notifying the process associated with the MR/MW of the write of data to the MR/MW comprises processing, by the process, the CQE.

* * * * *